United States Patent [19]
Muston et al.

[11] Patent Number: 5,806,328
[45] Date of Patent: Sep. 15, 1998

[54] APPARATUS FOR SERVICING REFRIGERATION SYSTEMS

[75] Inventors: Robert L. Muston, Kialla; Mario Matkowitch, Williamstown, both of Australia

[73] Assignee: Environmental Products Amalgamated Pty. Ltd., Australia

[21] Appl. No.: 677,312

[22] Filed: Jul. 9, 1996

Related U.S. Application Data

[63] Continuation of Ser. No. 223,592, Apr. 6, 1994, Pat. No. 5,533,359, which is a continuation of Ser. No. 998,125, Dec. 19, 1992, Pat. No. 5,367,888, which is a continuation of Ser. No. 856,016, Mar. 23, 1992, abandoned.

[30] Foreign Application Priority Data

Mar. 22, 1991 [AU] Australia .................. PK5224

[51] Int. Cl.[6] .................................. F25B 45/00
[52] U.S. Cl. ................ 62/149; 62/292; 62/475
[58] Field of Search .................. 62/77, 85, 292, 62/149, 475

[56] References Cited

U.S. PATENT DOCUMENTS

| | | | |
|---|---|---|---|
| 4,476,688 | 10/1984 | Goddard | 62/292 |
| 4,942,741 | 7/1990 | Hancock et al. | 62/292 |
| 5,094,087 | 3/1992 | Gramkow | 62/292 |

*Primary Examiner*—John M. Sollecito
*Attorney, Agent, or Firm*—Welsh & Katz, Ltd.

[57] ABSTRACT

Portable apparatus for servicing a refrigeration system having a refrigerant containing an oil lubricant. The apparatus includes a support frame, a modular housing supported by the frame and defining internal accumulator, condenser, storage, and high and low pressure filter chambers, and a control plate assembly having a plurality of flow passages enabling flow communication between the various chambers. The control plate is adopted for connection to the refrigeration system being serviced, and has control valves operative to control flow of refrigerant through the passages to and between the internal chambers. A processor controls the control valves in a manner enabling selective recovery, evacuation, charging and/or flushing of the refrigerant of the refrigeration system.

7 Claims, 22 Drawing Sheets

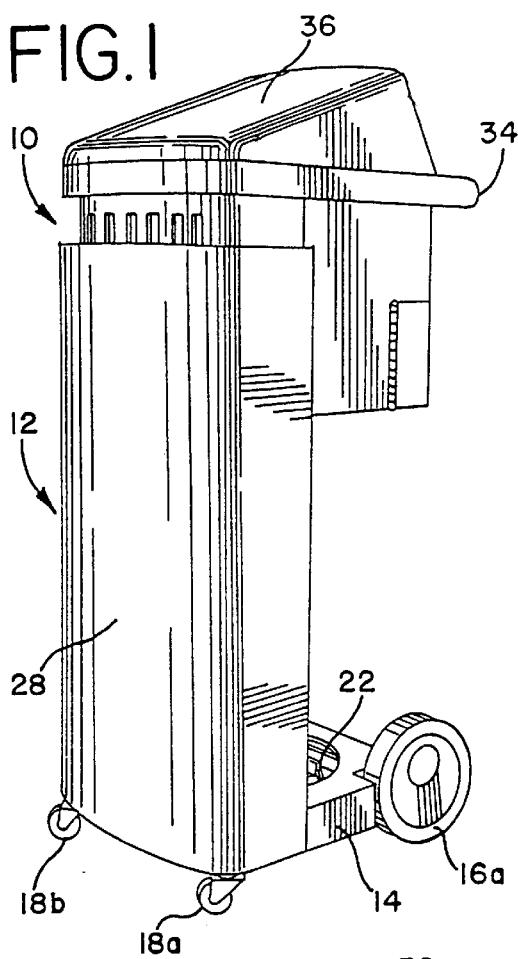
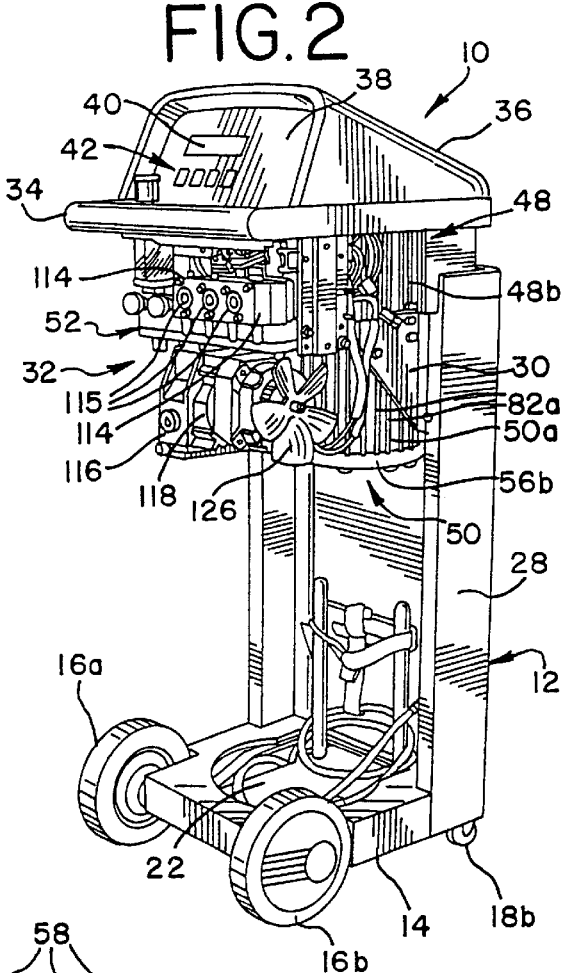
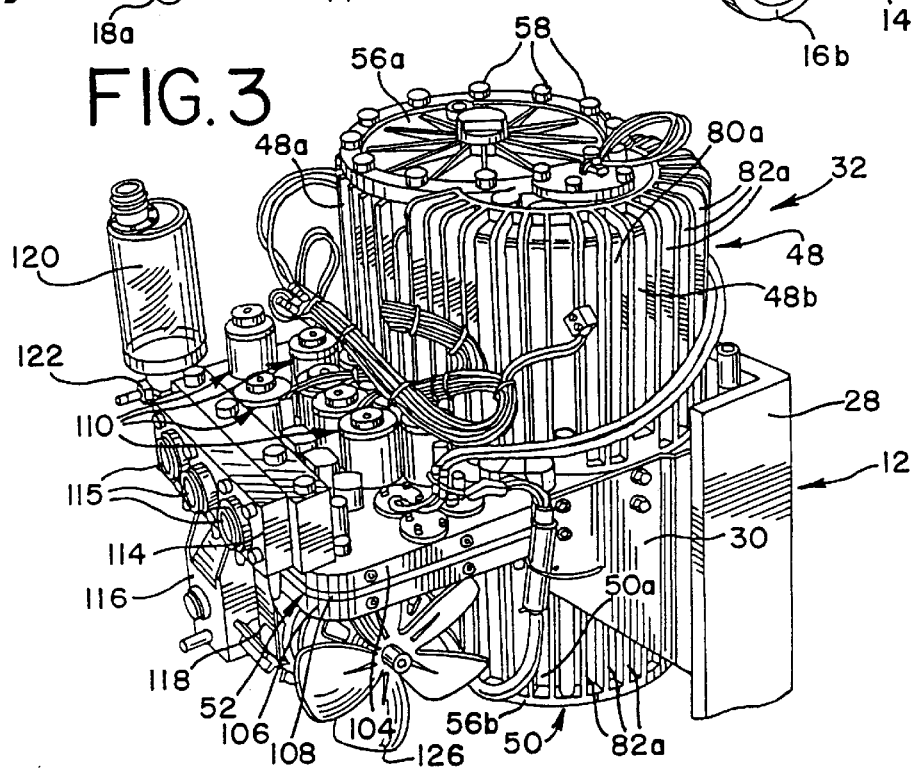

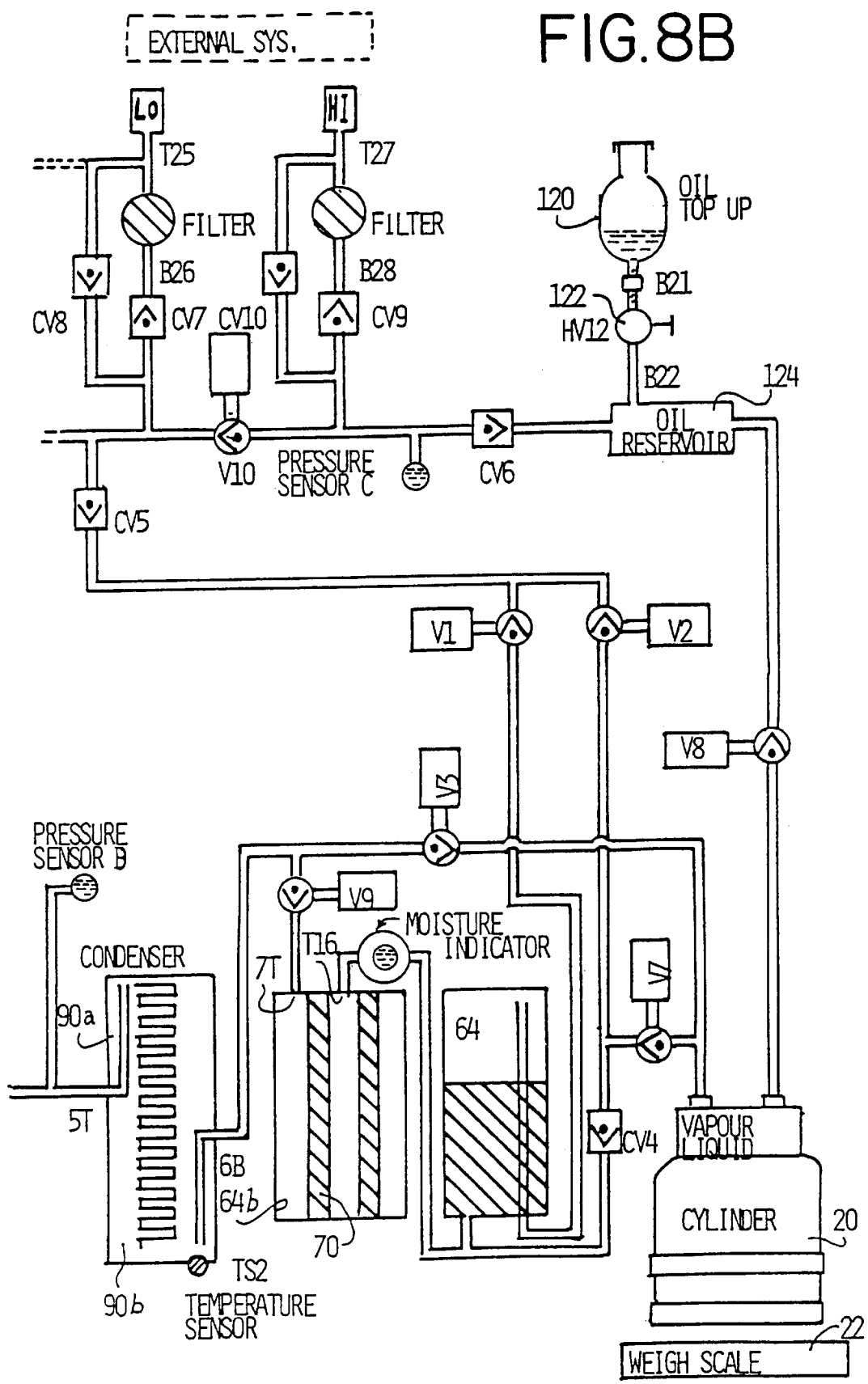

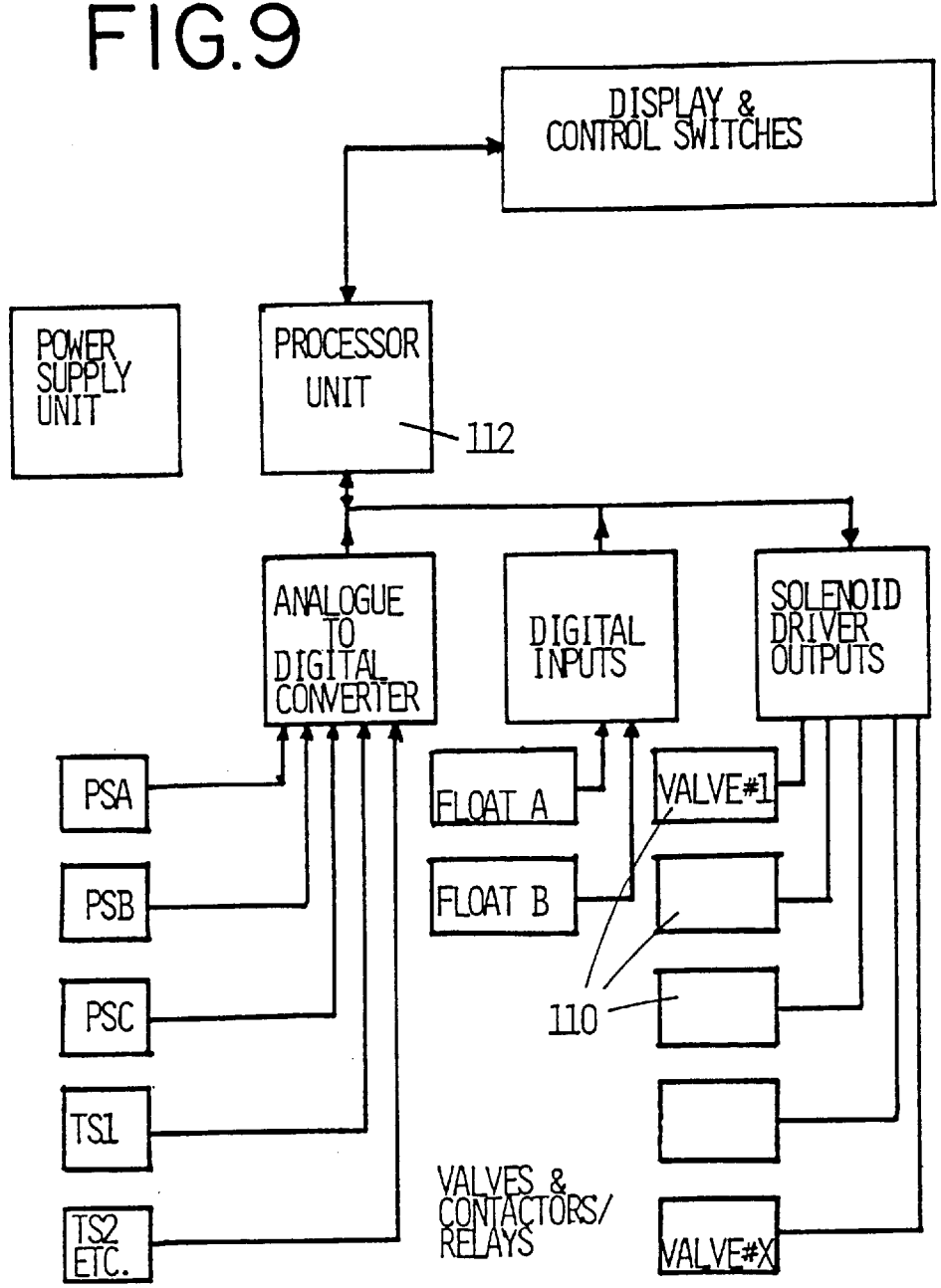

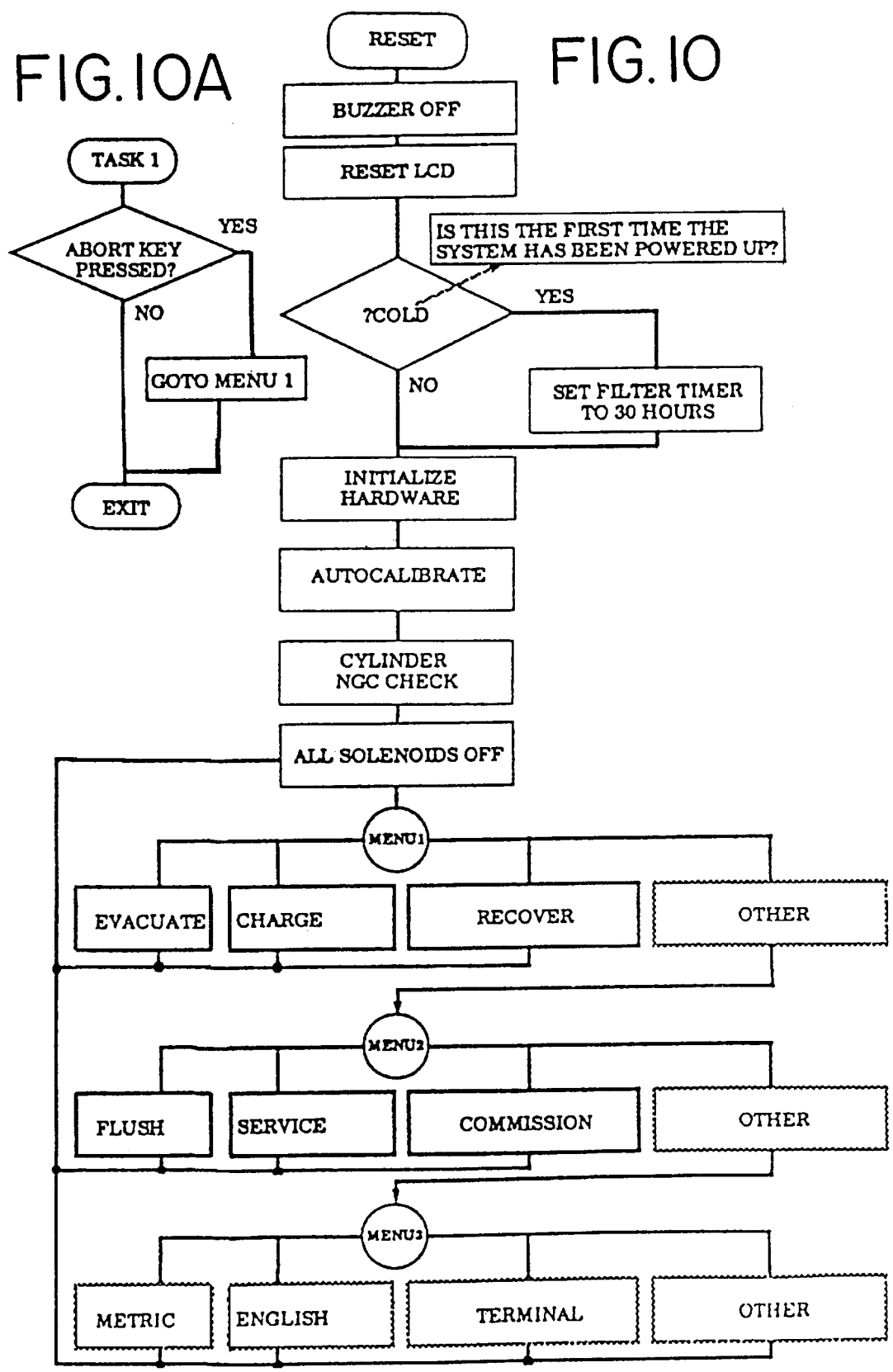

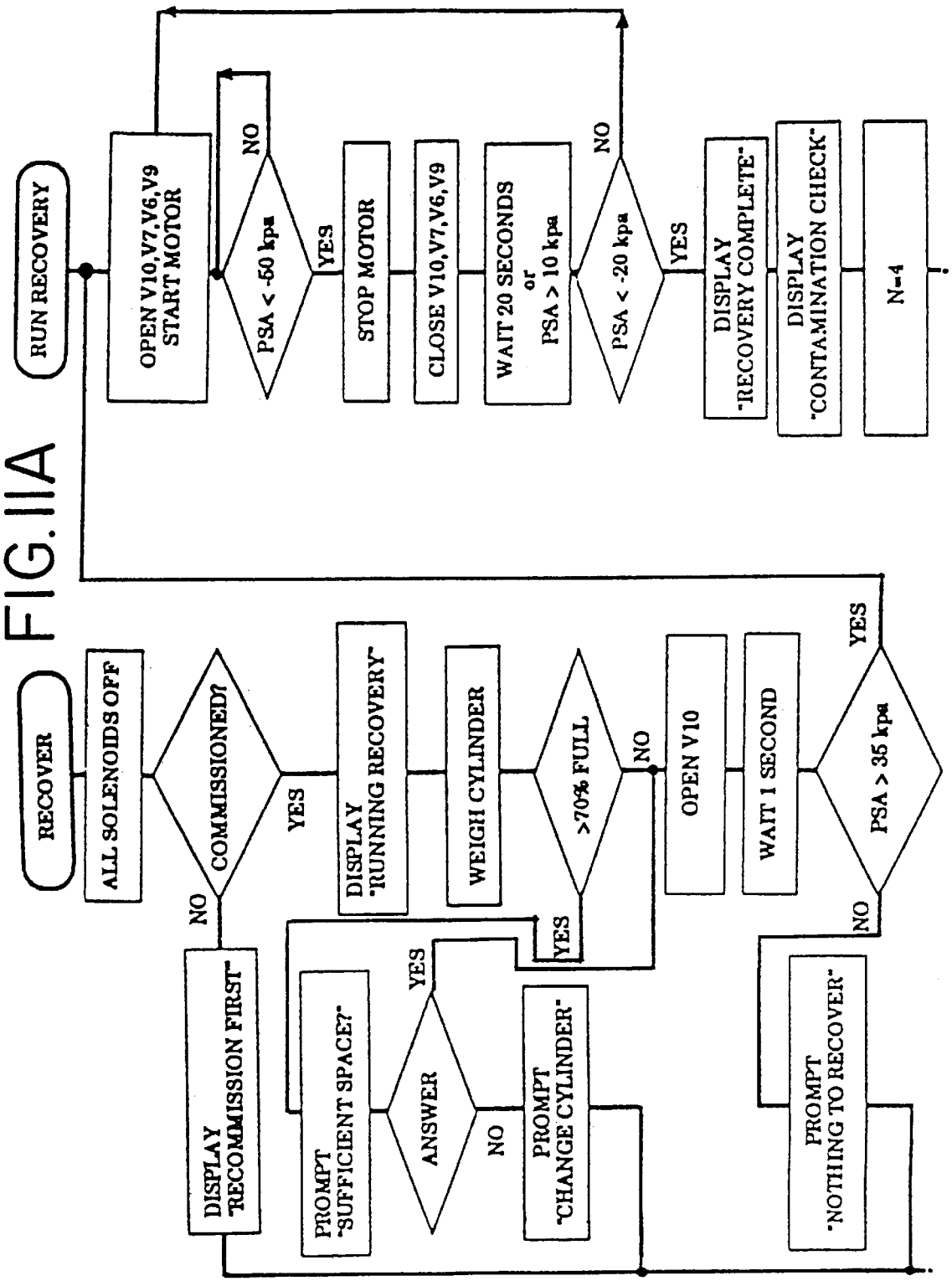
FIG.IIA

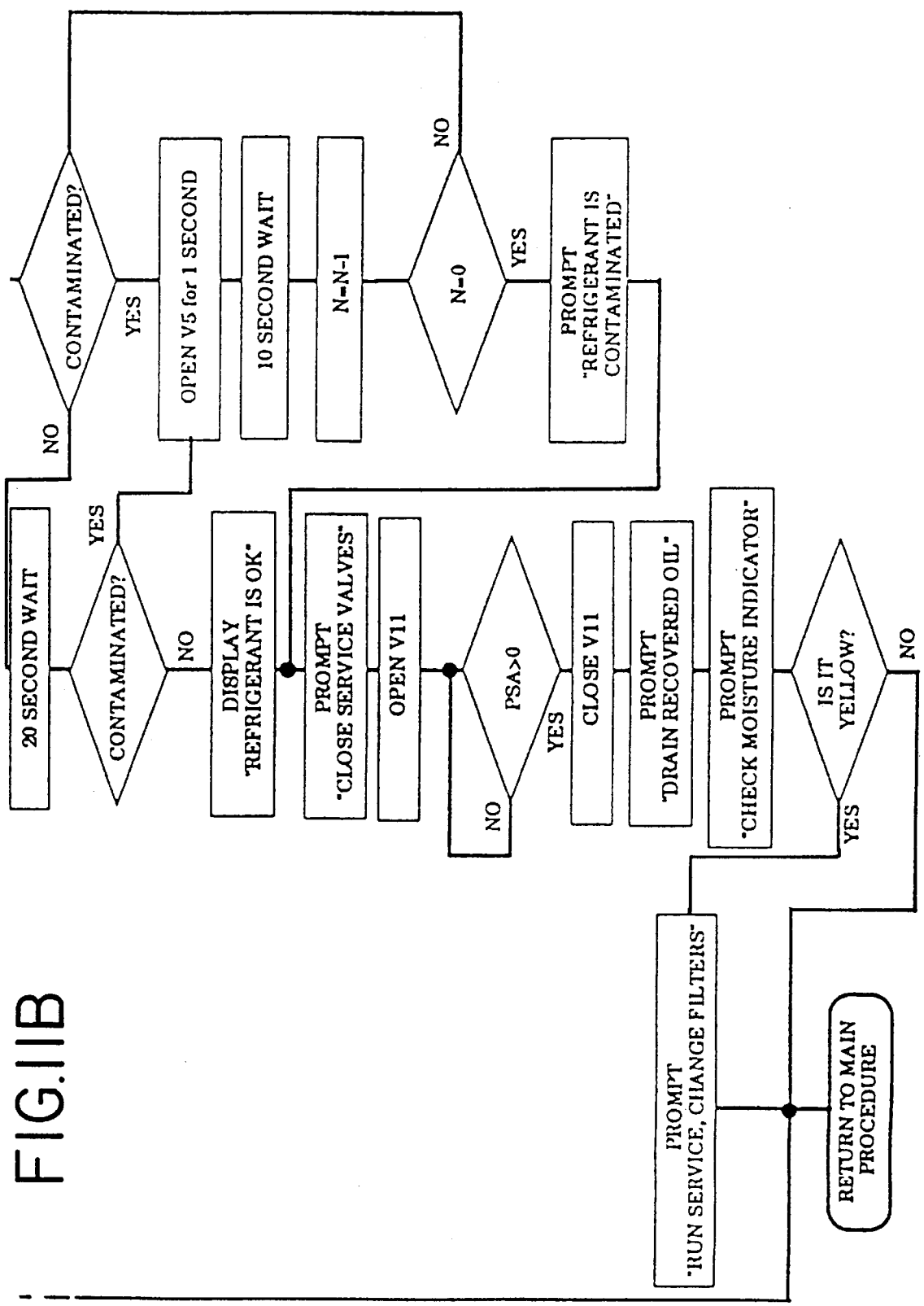

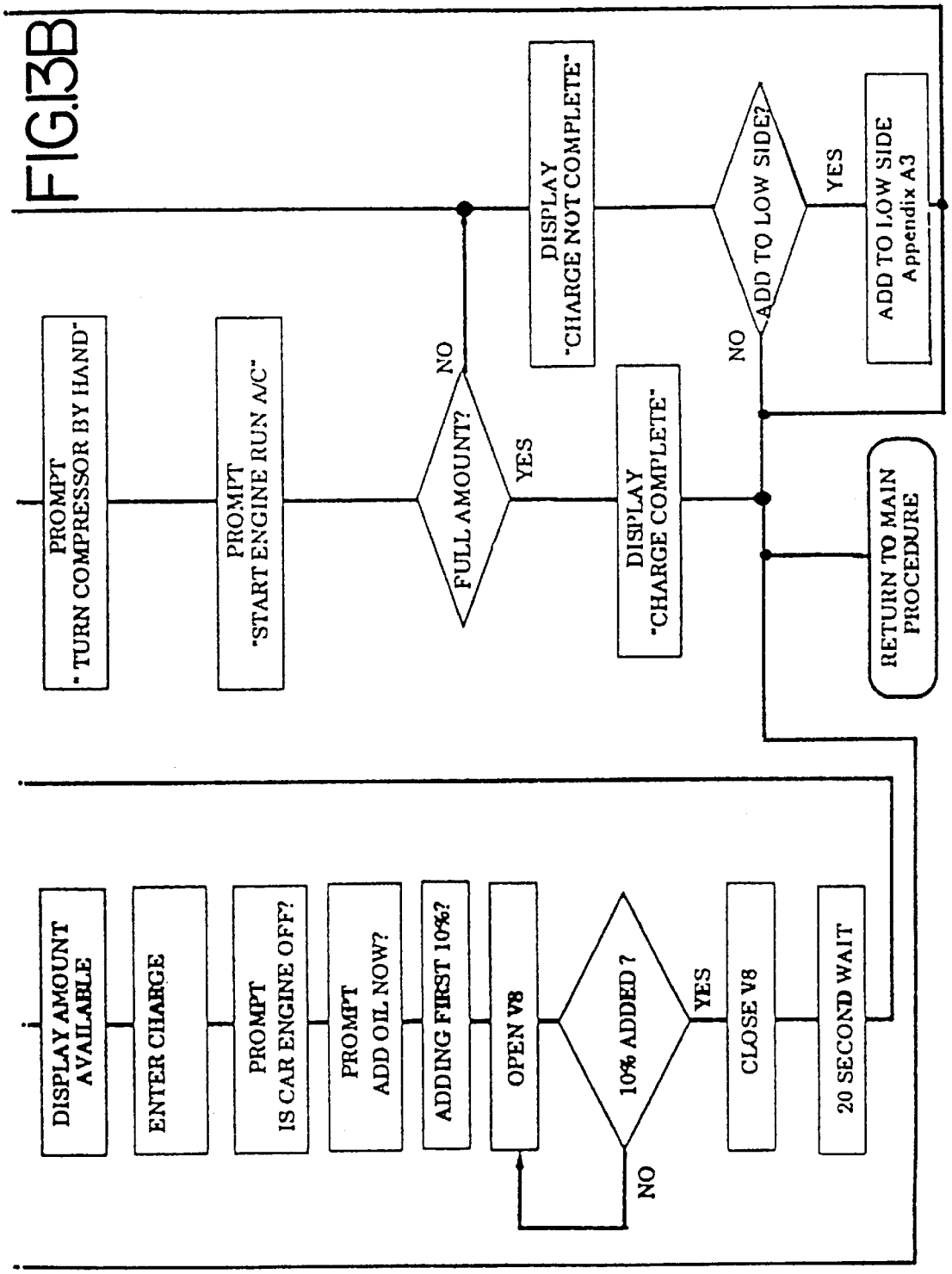

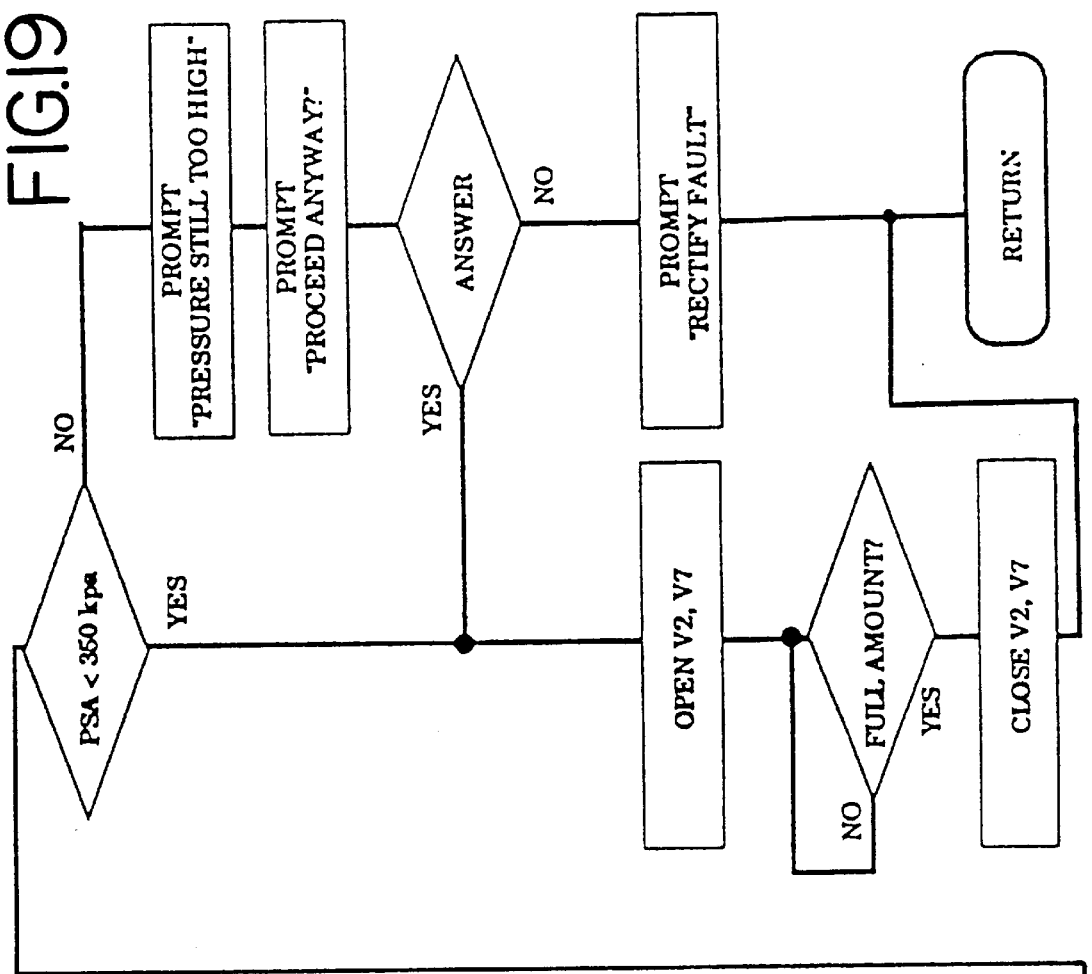
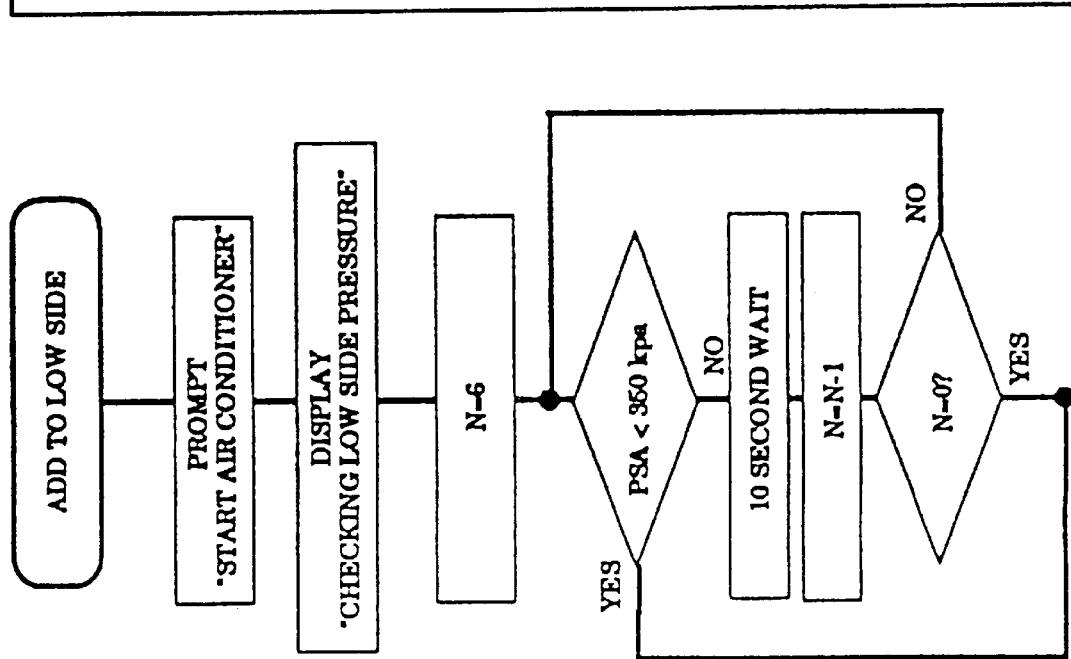
FIG.19

APPARATUS FOR SERVICING REFRIGERATION SYSTEMS

This is a continuation of Ser. No. 08/223,592, filed Apr. 6, 1994, now U.S. Pat. No. 5,533,359, which is a continuation of application Ser. No. 07/998,125, filed Dec. 19, 1992, now U.S. Pat. No. 5,367,888, which is a continuation of Ser. No. 07/856,016, filed Mar. 23, 1992, now abandoned.

BACKGROUND OF THE INVENTION

The present invention relates generally to apparatus for servicing refrigeration systems, and more particularly to a novel portable apparatus for use in selectively recovering, recycling, recharging and/or flushing refrigerant from a refrigeration system without releasing the refrigerant to atmosphere.

It has been a common practice in servicing air conditioning and refrigeration systems, collectively termed refrigeration systems, such as employed in private and commercial vehicles and buildings, to vent to atmosphere refrigerant removed from the systems preparatory to servicing. With the increasing concern for environmental safety, it is no longer an accepted practice to vent or discharge refrigerant, such as refrigerants commercially available under the trademark "Freon", into the atmosphere due to their deleterious affect on the ozone layer. While refrigerants have been developed which are less toxic and less detrimental to the environment, legislation has been enacted in most jurisdictions which prohibits release of any refrigerants into the atmosphere. In an attempt to comply with this mandate, numerous attempts have been made to provide refrigerant processing or servicing apparatus which do not allow escape of refrigerant into the atmosphere.

In addition to environmental concerns, it is desirable that any apparatus employed to service air conditioning or refrigeration systems in vehicles and buildings be portable to enable easy transport of the refrigeration system processing apparatus to a job site. In the case of automobile or other vehicle air conditioning systems, it is highly desirable that the refrigerant processing apparatus be capable of selectively performing a number of different functions or combinations of functions, such as recycling of the refrigerant to remove oil, moisture, acids, foreign particles, and non-compressible gas in the form of air; recovery of the refrigerant wherein the refrigerant is removed from the vehicle system and passed to a storage reservoir to enable servicing and repair of the vehicle air conditioning system; recharging wherein refrigerant is removed from the vehicle system by vacuum and combined with additional refrigerant for return to the vehicle system; and flushing during which clean liquid refrigerant is charged into the high pressure side of the system while simultaneously recovering refrigerant from the low pressure side for removal of dirty oil and other contaminants from the refrigerant that might result from failure of the system compressor.

Currently used refrigerant recovery apparatus employ a number of discrete components, such as an accumulator, compressor, filter, vacuum pump, condenser, and associated valves and sensors, which are interconnected by appropriate piping for conveying the refrigerant to and from the various components. Assembly of the various components and associated piping during manufacture is labor intensive and prone to leaking and other quality control problems, thereby adding significantly to the total manufacturing cost. Moreover, the addition of a component, such as a hand valve, solenoid or check valve, to known refrigerant recovery apparatus generally entails adding at least one support bracket, and therefore extra piping and fittings, thereby leading to even greater cost and higher likelihood for failure.

It is known in refrigerant recovery apparatus to use some regenerative heat transfer, e.g. passing the high pressure refrigerant outlet pipe from the compressor through the accumulator so as to utilize heat in the compressed refrigerant for assisting evaporation of refrigerant entering the accumulator. This generally requires additional piping and a specially constructed accumulator with a heat recovery coil provided therein. Presently used refrigerant recovery apparatus also utilize a separate compressor and vacuum pump which adds significantly to the cost of the apparatus.

A further shortcoming of known refrigerant recovery apparatus relates to the possibility of incorrect operation of the apparatus. For example, where controls can be manually operated and the sequence of operations can be manually manipulated by an operator, an untrained or careless operator can operate the various controls, such as valves and switchable components, in an incorrect or inappropriate sequence leading to possible damage to the recovery apparatus and to the external system from which the refrigerant is being recovered. Risk of operator injury and release of refrigerant to atmosphere are also increased.

A general object of the present invention is to provide a novel and improved method and apparatus for recovering refrigerant from a refrigeration system.

A more particular object of the present invention is to provide a novel method and apparatus for selective recovery, recycling, recharging and/or flushing of refrigerant from a refrigeration system wherein a major portion of any selected operating phase is carried out automatically with minimal exercise of discretionary operator control.

Another object of the present invention is to provide a novel apparatus for selective recovery, recycling, recharging and/or flushing of refrigerant from a refrigeration system, wherein the apparatus is embodied in a mobile unit and includes a generally unitary compact housing defining an internal accumulator chamber, a condenser chamber, high pressure and low pressure filter chambers, and a storage chamber which are adapted for selective fluid communication through a flow channel and control valve arrangement which eliminates the relative complex tubing and valving arrangements characteristic of prior refrigerant recovery, recycling and recharging systems.

Still another object of the present invention is to provide a novel refrigerant recovery apparatus in which a single compressor/vacuum means functions as both compression means during recovery and as vacuum means during evacuation of an external system prior to recharging.

A feature of the refrigerant recycling, recovery and recharging apparatus of the invention lies in the provision of a programmed controller which precludes operation of the apparatus in a deleterious manner through minimizing incorrect or undesirable operation of the components or the sequence of operation.

SUMMARY OF THE INVENTION

In carrying out the present invention, a refrigerant servicing apparatus is provided which, in a preferred embodiment, includes a generally upstanding support frame having wheels mounted on its lower end to facilitate portability. The support frame carries a compact housing having discrete internal chambers of predetermined size and configuration to define an accumulator chamber, condenser chamber, high and low pressure filter chambers, and a storage chamber. Common walls between certain of the chambers enable desired heat transfer, for example, from a high pressure, high temperature condenser chamber to an adjacent accumulator chamber to vaporize refrigerant in the accumulator chamber. The housing may be made as a cast metal housing and serves as a heat sink to assist in condensing the refrigerant.

In the described embodiment, the housing includes a pair of generally identical housing portions which interface with an intermediate control plate having internal flow passages and associated control valves operable through a microprocessor to effect selective flow communication between the various chambers. A manifold mounted on the control plate facilitates connection of the control plate through conduits to a refrigeration system to be serviced, such as a vehicle air conditioning system. A motor driven compressor/vacuum pump is mounted on the housing, with the drive motor also driving a fan blade to circulate air over heat transfer fins on the exterior of the housing.

The support frame also carries electronic control means in the form of a suitable programmed microprocessor and associated interface and memory circuits. The microprocessor is programmed to enable operator selection of various operating functions, such a recovery, recycling, recharging and/or flushing of refrigerant from the system being serviced. A control panel having an LCD display and operator function controls is supported on the apparatus and forms part of the control means to enable convenient operator input of command signals and operator response to requests for operator decisions from the control means. The microprocessor automatically operates the various control valves and compressor/vacuum pump to properly carry out the selected operating functions, and substantially prevents operator error.

Further objects, features and advantages of the present invention, together with the organization and manner of operation thereof, will become apparent from the following detailed description of the invention taken in conjunction with the accompanying drawings wherein like reference numerals designate like elements throughout the several views.

BRIEF DESCRIPTION OF THE DRAWINGS

FIG. 1 is a perspective view of a portable apparatus for servicing refrigeration systems in accordance with the present invention;

FIG. 2 is a perspective view taken from the rear of the apparatus of FIG. 1 but with portions of the external cover removed for purposes of clarity;

FIG. 3 is a perspective view of the modular housing assembly and associated valving employed in the apparatus of FIGS. 1 and 2;

FIGS. 8A and 8B illustrate schematic circuit diagrams showing the various functional components employed in the apparatus of FIG. 1;

FIG. 9 is a schematic block diagram of the electrical control and processor employed in the apparatus of FIG. 1;

FIG. 10 is a flow diagram of the general processing methodology for the processor employed in the apparatus;

FIG. 10A illustrates in flow diagram format the processor mythology to be carried out to determine the condition of the abort key prior to accessing menu 1 in the flow diagram of FIG. 10;

FIGS. 11A and 11B illustrate in flow diagram format the processing mythology for the recovery procedure carried out with the apparatus of FIGS. 1 and 2 during servicing of a refrigeration system;

FIGS. 13A and 13B illustrate in flow diagram format the processing mythology for carrying out the charge procedure with the refrigerant servicing apparatus of FIGS. 1 and 2;

FIG. 19 illustrates in flow diagram format the processing mythology for adding refrigerant to the low pressure side of the refrigeration system being serviced with the refrigerant servicing apparatus of the invention.

DETAILED DESCRIPTION

Figure 4:
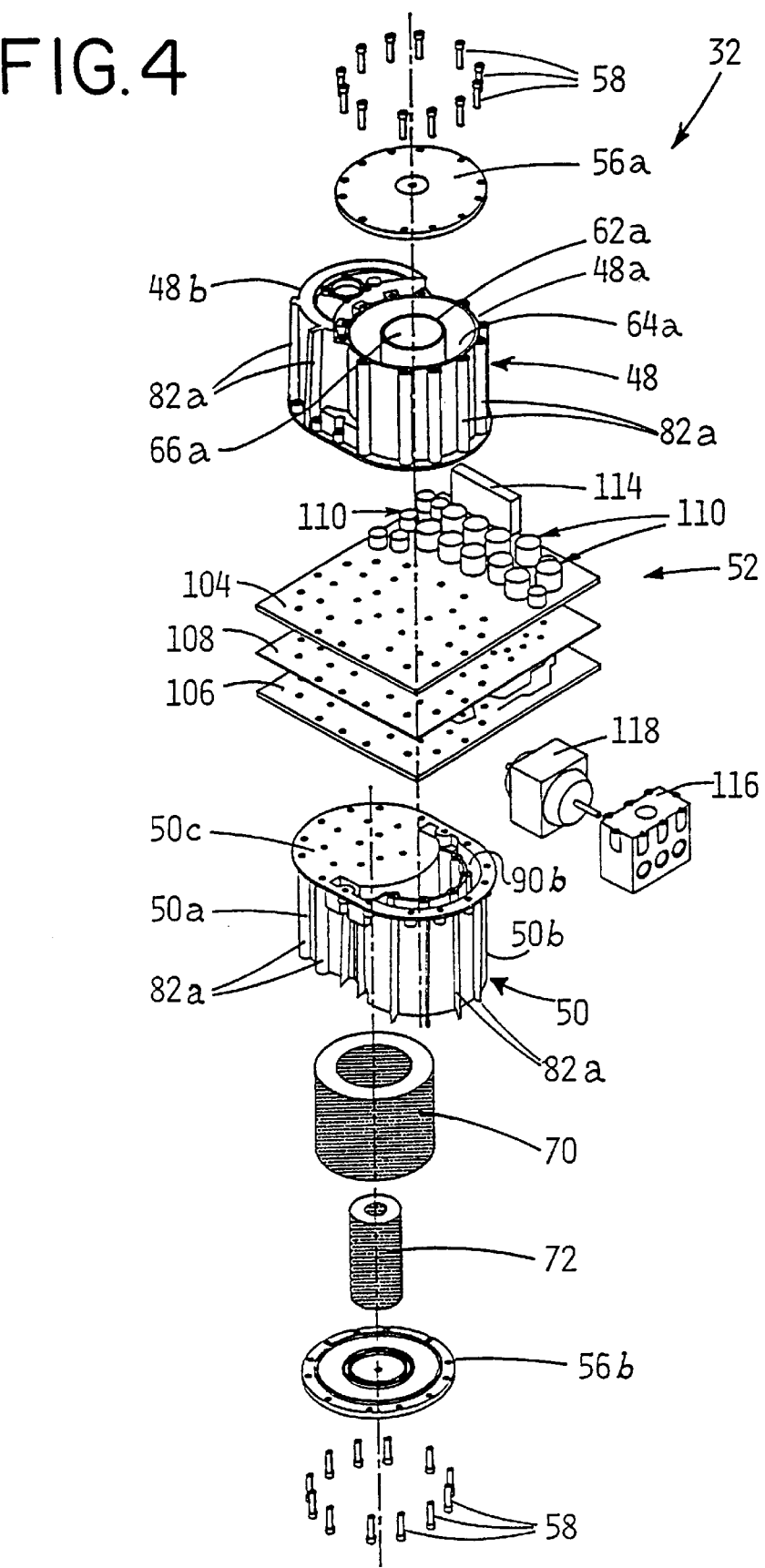
FIG. 4 is an exploded perspective view illustrating in schematic fashion the modular housing and associated control plate as illustrated in FIG. 3.

Referring now to the drawings, and in particular to FIGS. 1 and 2, a portable apparatus for servicing refrigeration systems in accordance with the present invention is indicated generally at 10. As used herein, reference to refrigeration systems refers to air conditioning systems as employed in private and commercial vehicles and buildings, as well as refrigeration systems or other systems wherein a refrigerant is used. The refrigeration servicing apparatus 10 enables various servicing functions or cycles to be performed on the external refrigeration system being serviced, such as recovery, recycling, recharging and/or flushing, or various combinations of these functions, of the refrigerant from the refrigeration system being serviced without significant release of refrigerant to the atmosphere.

In conventional air conditioning and refrigeration systems, refrigerant exists in both a liquid and vapor state. Refrigerant is also dissolved or suspended in the lubricating oil which circulates in the various conduits or passages of the air conditioning system with the refrigerant. Thus, when refrigerant is recovered from the refrigeration system being serviced, both liquid and vapor refrigerant will generally contain some amount of oil. Contaminants, such as non-condensable gas (generally in the form of air), moisture and other foreign matter is often contained in both the refrigerant and the oil. As will be described, the refrigerant servicing apparatus 10 is operative to recycle the refrigerant to remove oil, moisture, acids, foreign particles and non-compressible gas (air). The servicing apparatus 10 may also be operated in a recovery cycle or mode wherein refrigerant is removed from the system being serviced and passed to a storage reservoir to enable servicing and repair of the refrigeration system, such as a vehicle air conditioning system. Further, the apparatus 10 may be operated in a recharging cycle or mode wherein refrigerant is removed from the vehicle system by vacuum and combined with additional refrigerant for return to the vehicle system. In yet another mode of operation, the servicing apparatus 10 may be employed in a flushing cycle during which clean liquid refrigerant is charged into the high pressure side of the system while simultaneously removing refrigerant from the low pressure side for removal of dirty oil or other contaminants from the refrigerant. As will also be described, the refrigerant servicing apparatus 10 includes electronic control means in the form of a dedicated microprocessor system which is programmed to control the various control valves and provide procedural logic associated with the various operating cycles or functions of the apparatus.

As illustrated in FIGS. 1 and 2, the refrigerant servicing apparatus 10 includes an upstanding support frame, indicated generally at 12, having a base 14 on which a pair of rear wheels 16a and 16b and a pair of forward smaller size caster-type wheels 18a and 18b are mounted to facilitate portability of the refrigerant servicing apparatus. The base 14 serves to support a cylinder, indicated schematically at 20 in FIG. 8, which serves as an external storage vessel for refrigerant. A weight scale, indicated schematically at 22 in FIG. 8, is also supported by the base 14 and, as will be described, provides a signal responsive to the weight of the cylinder 20 and thus the volume of refrigerant contained therein whereby to provide an indication of the fullness of the storage cylinder 20.

The upstanding support frame 12 includes an upstanding column-like portion 28 which may be made of a suitable strength sheet metal and which is fixed at its lower end to the base 14 and extends upwardly from the base to approximately chest height of an operator. A pair of laterally opposed support brackets, one of which is indicated at 30 in FIG. 2, are fixed to the column portion 28 and serve to support a modular housing assembly, indicated generally at 32, and various operating components as will be more fully described. A handle 34 is also supported at the upper end of the column portion 12 to facilitate manual maneuvering of the apparatus 10.

The support frame 12 has an upper removable cover 36 which overlies and protects the microprocessor and associated interface and memory circuits of the electronic control means. A panel 38 is supported at the upper end of the support frame 12, also at approximately operator chest height, and serves as a control panel. An LCD display 40 is exposed within the panel 38 and displays various operating parameters, such as pressures, temperatures and cylinder weight, which are continually updated. The display 40 also displays instructions and indicia indicating the progress of the particular procedure or operating function being carried out by the apparatus 10. A push button keypad is also exposed through the control panel 38 and includes a plurality of push buttons, four of which are indicated at 42.

Figure 6:
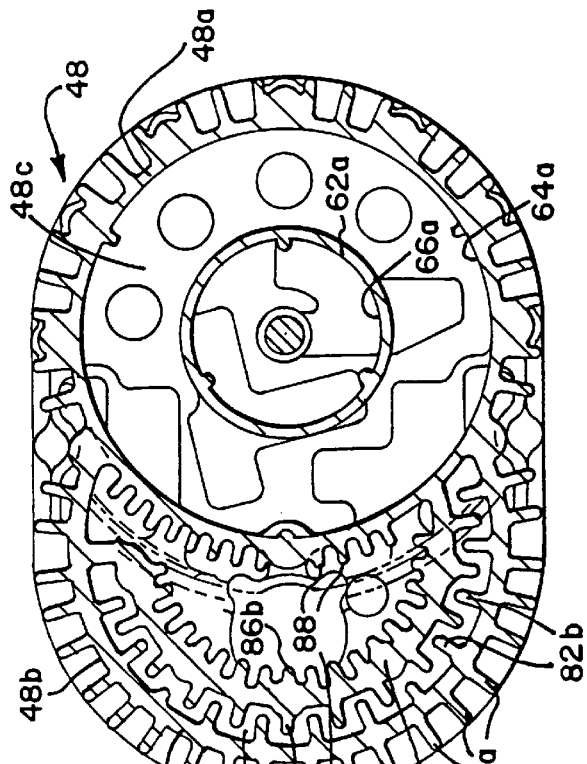
FIG. 6 is a transverse sectional view taken substantially along line 6—6 of FIG. 5 but with internal filter components removed for clarity.
Figure 7:
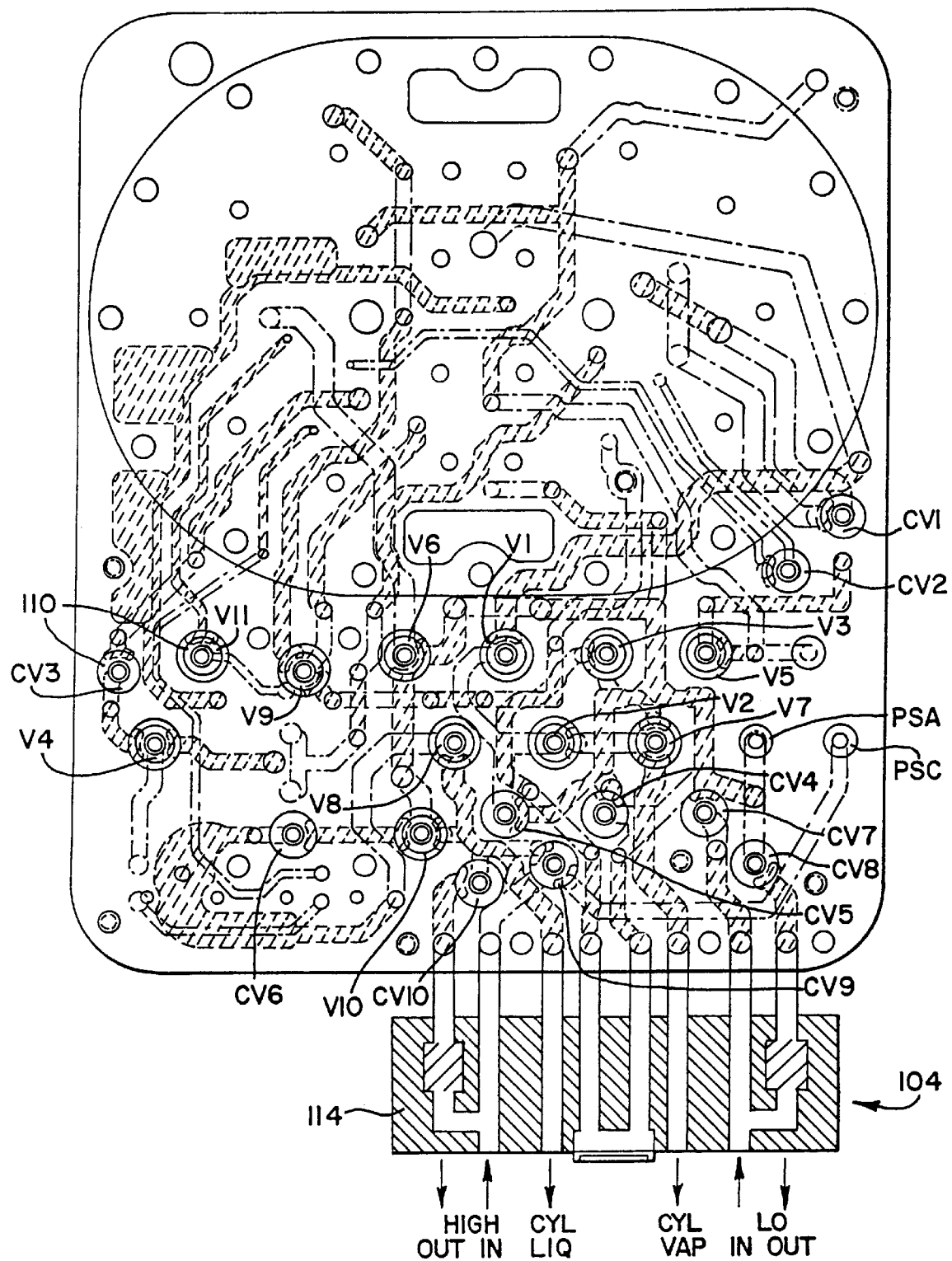
FIG. 7 is a plan view of the sandwich construction control plate employed in the housing assembly illustrated in FIGS. 3 and 5.
Figure 8A:
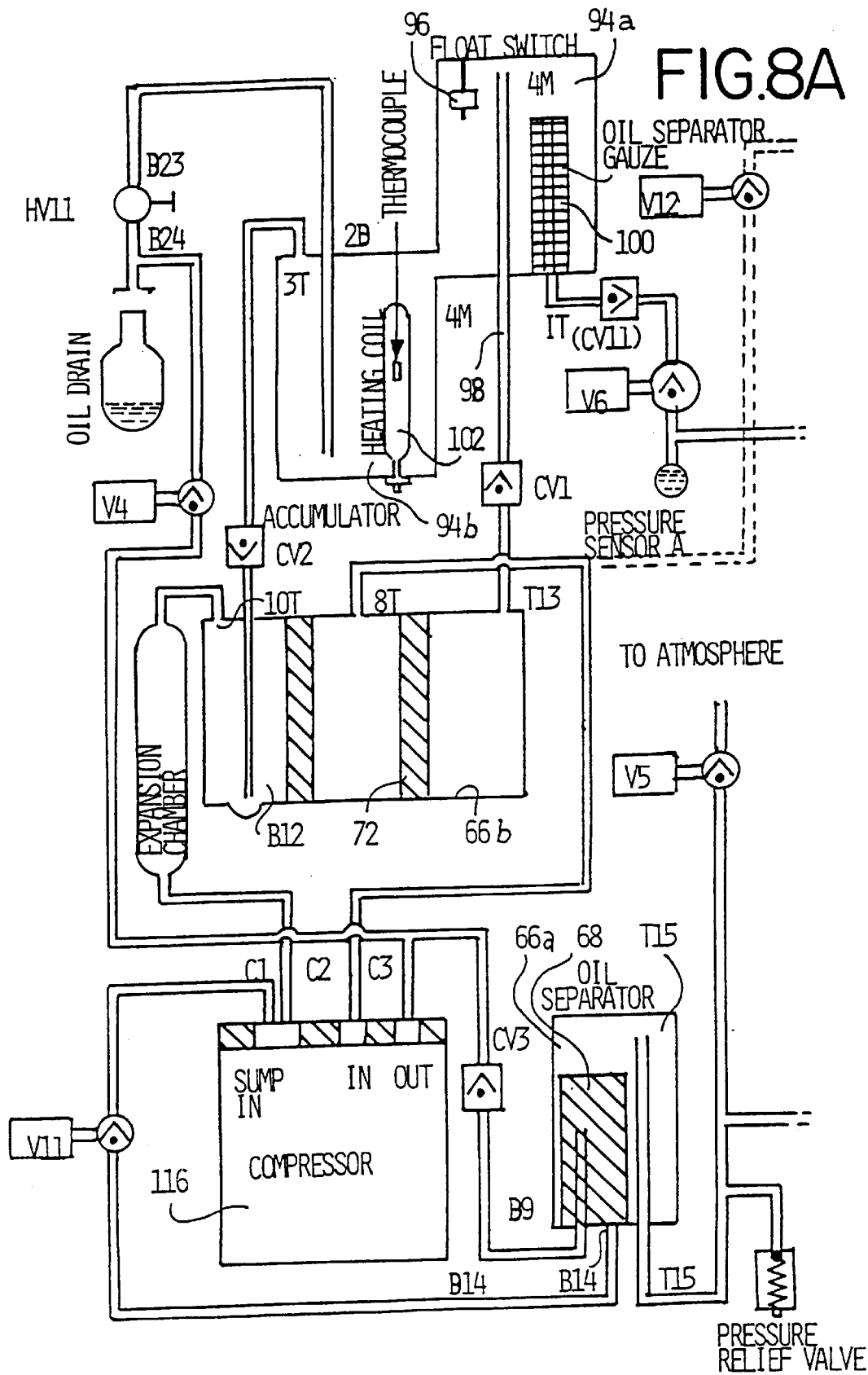

Referring now to FIGS. 3–7, taken in conjunction with FIG. 8, the modular housing assembly 32 includes a pair of substantially identical housings 48 and 50 which are assembled in interfacing relation with an intermediate control plate assembly 52. Each of the housings 48 and 50 has a first generally cylindrical end portion 48a and 50a, respectively, and a second generally semi-circular portion, indicated at 48b and 50b, respectively. The housings 48 and 50 may be made of a suitable cast metal, preferably aluminum, so that the end of each of the generally cylindrical portions 48a and 50a which interfaces with the control plate 52 is closed by an end wall, such as indicated 50c in FIG. 4. The opposite ends of the cylindrical housing portions 48a and 50a are open and covered by removable circular end plates 56a and 56b. The end plates 56a,b may be secured to the respective housings 48a and 50a through suitable screw fasteners 58.

An annular wall, indicated at 62a and 62b, respectively, is formed integral with each of the housings 48 and 50 and extends upwardly from the respective bottom walls 48c and 50c concentric with the corresponding outer cylindrical walls 48a and 50a. The annular walls 62a and 62b cooperate with the associated end plates 56a and 56b to establish to discrete chambers within the associated cylindrical housing portions 48a and 50a. In this manner, a pair of annular chambers, indicated at 64a and 64b, are formed within the housings 48 and 50 concentric with corresponding cylindrical chambers as indicated at 66a and 66b, respectively. The chamber 64a defines an internal storage chamber in the housing assembly 32, while the chamber 66a defines an oil separator chamber having a gauze type oil separator filter 68 therein.

Figure 5:
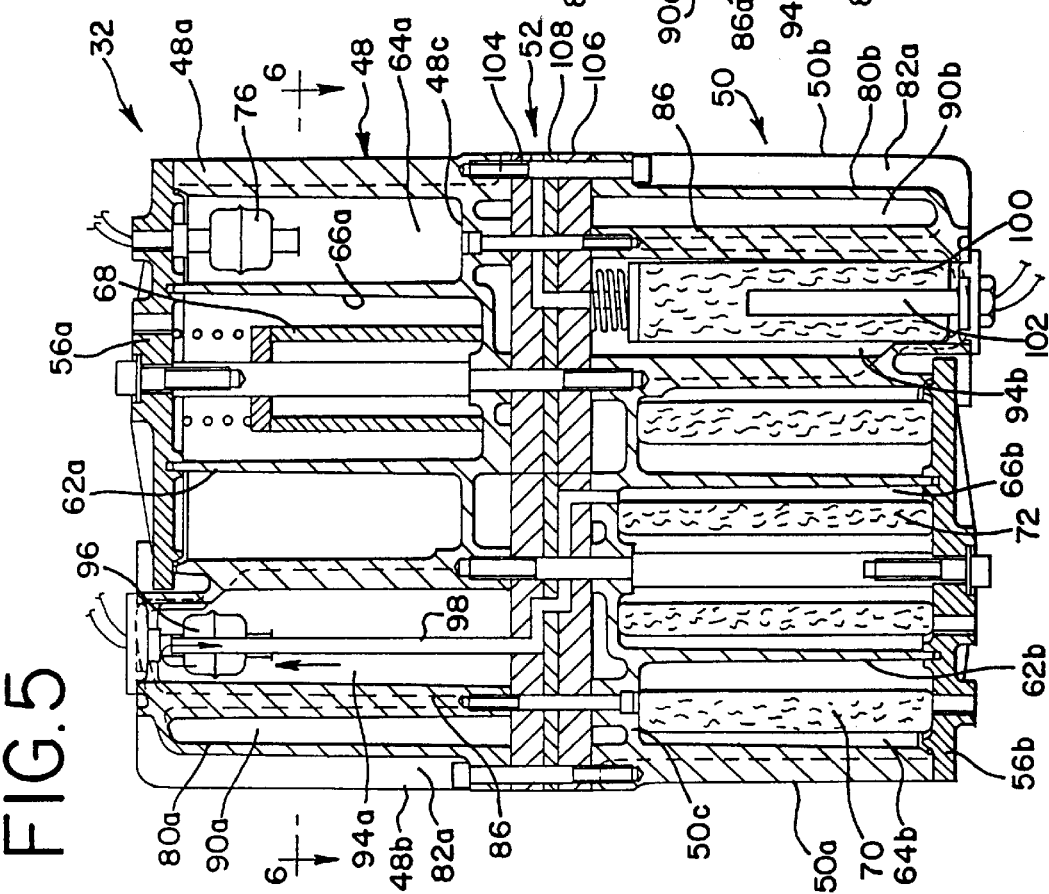
FIG. 5 is a vertical sectional view taken substantially through the major longitudinal axis of the modular housing and control plate assembly.

The annular chamber 64b in the lower cylindrical housing portion 50a receives an annular filter 70 which is defined as the high pressure side filter and is preferably made of an activated aluminum and/or molecular sieve, and/or an activated charcoal. The filter 70 serves to filter out water molecules or droplets from the refrigerant as the refrigerant passes through the chamber 64b, as will be described. A similar annular filter 72 is positioned within chamber 66b and serves as the low pressure side filter within the modular housing 32. As illustrated in FIG. 5, a float switch 76 is preferably supported within the internal storage chamber 64a and is operative to provide a signal in response to a predetermined liquid refrigerant level within the storage chamber 64a.

The generally semi-cylindrical or semi-circular end portions 48b and 50b of the housings 48 and 50, respectively, also define internal discrete chambers within the housing assembly 32 when the housings 48 and 50 are mounted on the control plate assembly 52. As illustrated in FIGS. 5 and 6, the housings 48 and 50 have outer arcuate walls, indicated at 80a and 80b, which have integral generally radially outwardly and radially inwardly extending fins such as indicated at 82a and 82b in FIG. 6, which extend the full longitudinal length of the respective housings 48 and 50. External cooling fins, such as indicated at 82a, also are formed integral with and externally of the corresponding cylindrical end portions 48a and 50a of the housings 48 and 50.

An internal generally semi-circular wall, indicated at 86 in FIG. 6, is formed integral with each of the cast housings 48 and 50 internally of the corresponding semi-circular end portions 48b and 50b. The arcuate walls 86 also have outwardly and inwardly directed longitudinally extending heat transfer fins, such as indicated at 86a and 86b in FIG. 6. Similarly, longitudinally extending heat transfer enhancing fins 88 are formed on the internal arcuate wall portions of each of the housings 48 and 50. In this manner, an internal chamber is formed in each of the housing portions 48b and 50b, such as indicated at 90a and 90b in FIGS. 5 and 6. The chambers 90a and 90b define upper and lower condenser chambers which are interconnected through suitable flow channels in the control plate assembly 52 so that the chambers 90a and 90b are in fluid communication.

The arcuate walls 86 in the housings 48 and 50 also establish a pair of internal chambers 94a and 94b within the housings 48 and 50, respectively, which are in fluid communication and define upper and lower accumulator chambers. An accumulator float switch 96 is supported within the upper accumulator chamber 94a and is operative to provide a signal responsive to the level of refrigerant within the upper accumulator chamber. An upwardly extending flow tube 98 is also supported within the upper accumulator chamber 94a and communicates with the control plate assembly 52 and corresponding internal flow passages to effect fluid communication between the upper end of the accumulator chamber 94a and the low pressure filter chamber 66b. A gauze type oil separator filter 100 is supported within the lower accumulator chamber 94b and is interconnected to the control plate 52 such that refrigerant from the external refrigeration system being serviced is passed through the filter 100 as it enters the accumulator chamber. If desired, the oil separator filter 100 can be supported within the upper accumulator chamber 94a as illustrated schematically in FIG. 8. A generally cylindrical resistance type heater element 102 is supported within the lower accumulator chamber 94b to facilitate selective heating and vaporization of the refrigerant within the accumulator chamber.

Referring now to FIGS. 4, 5 and 7, the control plate assembly 52 in the illustrated embodiment comprises an upper generally rectangular metallic plate 104, a similarly configured lower plate 106 and an intermediate plate 108. Each of the upper and lower plates 104 and 106 has a plurality of flow passages or channels formed in the surface thereof which interfaces with the intermediate plate 108 of the sandwich construction. These flow channels in the plates 104 and 106 communicate with the outer surfaces and with bores through the intermediate plate 108 in a predetermined manner so as to effect selective communication between the various aforedescribed internal chambers within the housing assembly 32, as depicted schematically in FIG. 8. Preferably, suitable gaskets are interposed between the plates 104, 106 and 108 and between the upper and lower plates 104 and 106 and the corresponding housings 48 and 50. The various flow passages or channels formed in the lower surface of the plate 104 are illustrated in FIG. 7 as shaded or cross-hatched channels, while the flow channels provided in the upper surface of the lower plate 106 are depicted in phantom.

Flow communication between the various internal chambers within the upper and lower housing portions 48 and 50 of the housing assembly 32, as well as flow communication between an external refrigeration system being serviced and the control plate assembly 52 is controlled by a plurality of normally closed electrically operated solenoid valves supported on the control plate 104. The various solenoid valves, represented generally by reference numeral 110 in FIG. 4, are identified in the schematic flow control circuit of FIG. 8 by the prefix "V" followed by a control valve number, such as 1 through 12, and are referred to in this manner in the following description of operation of the refrigerant servicing apparatus 10. As illustrated in the electrical schematic diagram of FIG. 9, the various solenoid valves are interconnected through solenoid driver outputs from a microprocessor such as indicated schematically at 112. A connector manifold, indicated schematically at 114 in FIG. 7 is mounted on the control plate assembly 52 and facilitates connection of the control plate assembly to the external refrigeration system being serviced through suitable flow conduits (not shown) interconnecting the manifold 114 to the high pressure and low pressure sides of the system being serviced. Suitable filters and check valves are employed as illustrated schematically in FIG. 8. Visual sight windows, three of which are shown at 115 in FIG. 3, are provided on the manifold 114 to enable visual observation of refrigerant flow to and from the manifold.

Compressor/vacuum pump means in the form of a motor driven compressor, indicated schematically at 116 in FIG. 4, and an associated electrical drive motor 118 are mounted to the lower control plate 106 and have high and low pressure ports connected to predetermined flow passages within the control plate assembly 52. The compressor/vacuum pump means is controlled by the processor 112 to selectively operate as a compressor or as a suction pump in accordance with the various operating cycles or modes of the apparatus 10.

Referring to FIG. 3, an "oil top up" reservoir 120, which is preferably of a suitable strength glass or plastic to enable visual observation of the contents, is supported on the control plate assembly 52 and contains lubricating oil to be added to the refrigerant during a recharge cycle or mode of operation of the servicing apparatus 10. A valve 122 interconnects the reservoir 120 to an oil reservoir (indicated schematically at 124 in FIG. 8) which is connected to the storage cylinder 20 to enable adding oil to the refrigerant. The programmed processor provides an indication to the operator on the display 40 to open the valve 122 at an appropriate time to add oil to the refrigerant.

Operation

Recovery Cycle

Referring particularly to the schematic circuit diagram of FIG. 8, the operation of the various operating cycles or modes is as follows. In a recovery cycle, refrigerant is recovered through hoses connected to the low and high pressure sides of the system to be recovered, such as a car air conditioning system, and to the inlets of the manifold 114. The microprocessor 112, alternatively termed the central processing unit (cpu), takes a reading from the cylinder weighing load cell 22 to determine if there is enough room to add refrigerant; for example 5 lbs. of refrigerant. If not, the operator is alerted to change the cylinder 20. The microprocessor is programmed to prevent the cylinder 20 from exceeding 80% capacity, and alerts the operator when the cylinder is 70% full. Valve V10 is then briefly opened, i.e. for one second, and pressure sensor A (PSA) is checked. Pressure in the system (if any) will have forced check valves CV7 and CV9 to unseat and for refrigerant to reach PSA and PSC. (V10 was opened to allow pressure from the high side to reach PSA in case the low side had no pressure.) If the pressure in the system is greater than a preset minimum, the microprocessor 112 turns on the compressor 116 and opens solenoid valves V10, V6, on the inlet to the compressor, and V9 and V7 on the outlet side. A check valve (CV11) may be installed between V6 and 1T to prevent back flow when the system is equalized by opening V11.

During recovery CV8 and CV10 remain closed forcing the refrigerant to flow through the inlet filter screens. During recharging and flushing, any refrigerant leaving the apparatus 10 will be forced through CV8 and/or CV10 preventing backwashing of these filters and sending contaminants into the system being serviced. The refrigerant flows into the accumulator/oil separator chamber 94a,b at port 1T. The oil separator 100 causes any incoming oil to cling to it and drain to the bottom of accumulator chamber instead of remaining in a mist and travelling further downstream with the refrigerant. The float 96 prevents over-filling of the accumulator chamber 94a by closing V6 when liquid refrigerant activates the float. V6 remains closed for a predetermined time delay to prevent chattering of the solenoid V6.

The heating element 102 is fitted with a thermocouple and is connected so as to only be activated when the compressor 116 is operating. A blockout prevents the heater from working when there is unlikely to be any refrigerant in the accumulator chamber such as when the compressor is being used as a vacuum pump. The heating element 102 heats the refrigerant to aid in its evaporation. The thermocouple controls the temperature range of the heating element. If the temperature in the condenser gets too high, the heating element ceases to function.

Refrigerant leaves the accumulator chamber at 4M and flows via CV1 to the low side filter 72 at T13. Any oil that was not trapped in the accumulator chamber will settle to the bottom of the filter chamber 66b. Refrigerant leaves chamber 66b at 8T and flows to the compressor inlet C2 after which it is compressed and flows via CV3 to the high side oil separator chamber 66a at B9. The function of the oil separator 68 is to return any oil that was picked up in the compressor by the refrigerant and return it to the sump of the compressor where it belongs. This is done by opening V11 for a brief period at intervals (e.g. every 2 minutes). Other methods of oil return can be used such as a float opening a valve when the oil reaches a certain level, or using a restrictive orifice of a size that will be small enough to allow the oil to flow back without allowing excess refrigerant to flow back as well.

Refrigerant leaves the separator chamber 66a via T15 and flows to top of the condenser chamber 90a. At this point there is a another port connected to a pressure relief valve and a solenoid valve V5 which can be opened to atmosphere to allow venting of the condenser chamber when it is required to get rid of non-condensable gases, such as air, from the top of the condenser chamber.

A feature of the modular housing assembly 32 is that the internal fins 82b help collect heat. A sheet metal shroud or cover about the housing assembly 32 enables fan blade 126, which is driven by the motor 118 as shown in FIG. 3, to circulate air over the outside of the external fins 82a. Refrigerant condenses on the inside fins 82b and flows to the bottom of the condenser chambers 90a and 90b. Any non-compressible gas will accumulate in the top of the condenser chamber 90a and can be vented via V5. This is done at the end of each recovery cycle. The microprocessor takes a reading from a pressure sensor (PSB) connected to the condenser chamber and from a temperature sensor (TS2) which is located at the refrigerant outflow point at the base of the condenser chamber. These two readings form the pressure/temperature relationship of the refrigerant which is then compared to a pre-programmed pressure/temperature chart. If the reading exceeds the preset limit, a series of venting and rechecking procedures take place until the pressure/temperature falls within limits or an alert is made to the operator indicating that the non-compressible gas levels are too high. During venting the solenoid V9 can also be opened to allow any non-compressible gas that may be in the high filter chamber 64b to be vented also. Each time the apparatus 10 is operated after it has been idle for a considerable period (e.g. overnight) and the temperatures have stabilized, non-compressible gas venting takes place with solenoid V3 open in order to vent any non-compressible gas which may be in the top of the storage cylinder.

Refrigerant enters the high pressure side filter chamber 64b through solenoid operated valve V9 and port 7T. The high filter 70 is positioned so that it will fill with liquid and the core will soak in the refrigerant and any moisture from the refrigerant will be removed. Refrigerant leaves via T16 and passes through a moisture indicator which may comprise a pad treated with a cobalt (or similar) salt to change color in the presence of moisture. The internal storage chamber 64a allows recovery of refrigerant from the system being serviced to continue in the event that the external storage cylinder 20 is removed. The internal storage chamber 64a also allows the housing assembly 32 and associated components to be made in a small scale format enabling an operator to take the apparatus to a remote location and recover refrigerant without needing additional storage, such as provided by the cylinder 20. In the illustrated embodiment, refrigerant passes through CV4 and V7 and enters the storage cylinder through the vapor port.

When the external system being serviced has been drawn into a partial vacuum, as indicated at PSA, for example to 5 in. Hg, operation is stopped and all solenoid valves close. After a pre-determined time, PSA and PSC check the pressure in the system. If it has risen beyond a preset limit the recovery procedure continues in a loop until all refrigerant has been removed and the pressure no longer rises. If the pressure exceeds a certain preset limit inside of the above time limit, the delay will be cancelled and the apparatus will go back into the recover mode. Such interruption can occur when refrigerant is trapped in the oil in the system, or in an accumulator chamber or drier which is very cold and prevents the refrigerant from boiling off quickly.

At the completion of the recovery cycle, a non-compressible gas check takes place. When this is finalized, the apparatus is equalized to pressurize the low pressure side for two reasons. The first is to allow any recovered oil to be drained away. By opening V11, the sump of the compressor is pressurized and any oil in the oil separator chamber 66a is returned to the compressor and flows to the low pressure filter chamber 66b via an expansion chamber. As the low pressure filter chamber 66b is pressurized, refrigerant also flows back to the accumulator chamber 94b via CV2 and 3T, taking with it any oil that may have collected in the filter chamber 66b. All the recovered oil is now in the accumulator chamber 94b and can be drained by opening valve HV11. The oil may be collected in a bottle which is accessible by opening an access door or cover.

The expansion chamber serves to absorb any pulsations caused by a compressor piston on the compressor sump. The compressor is provided with a sight glass to check the oil level, a fill plug and a drain plug. The compressor connects directly to the control plate assembly 52 and associated passages.

Evacuate Cycle

The evacuation cycle is similar to the recover cycle in that the refrigerant (or air) flow in the low pressure side of the apparatus follows in the same path. The evacuate cycle will not begin if there is too much pressure in the external system being serviced which would indicate that there is probably refrigerant present in the external system that should be recovered. The apparatus 10 prompts the operator through the display 40 to select the recover cycle first.

At the beginning of the evacuate cycle, the solenoid valves V6 and V10 open on the low pressure side as before. On the high pressure side, valve V4 opens and allows the compressor to discharge to atmosphere instead of into the storage cylinder. This is because the evacuate cycle is to remove any air, moisture and other vapors from the system prior to recharging. By creating a vacuum, any moisture present will boil off at a low temperature and be removed during the evacuation cycle.

The evacuate cycle ends at a preset time interval, for example, after 20 minutes, and the solenoid valves close and the compressor stops. The sensors PSA and PSC continue to monitor the pressure for a preset time interval. If the pressure in the external system rises indicating a loss of vacuum (beyond an allowable limit), the operator is alerted by a message on the display 40 and prevented from charging the external system until it will hold a vacuum. If the pressure in the external system fails to drop below a preset level within a certain time limit from the beginning of the cycle, the apparatus 10 will stop and alert the operator through the display 40 that there is a vacuum leak.

It will be understood that the compressor/vacuum pump 116 may comprise a piston type compressor to perform the functions of evacuating and compression during recovery. However, separate units could be used or a different type of compressor may be employed such as a vane type, scroll, or rotary piston type compressor.

If desired, a solenoid valve, such as indicated at V12, may be installed between the low pressure side inlet 8T to the filter chamber 66b and the inlet C2 of the compressor/vacuum pump 116 to eliminate any pressure drop caused by the spring pressure in the check valves. This ensures that a full vacuum reaches the external system.

Charge Cycle

The apparatus 10 has the ability to charge both liquid and vapor. In a vehicle air conditioner system, liquid cannot be charged into the system unless the vehicle system is inoperative. Otherwise liquid may be drawn into the inlet of the compressor which would result in failure. When the charge cycle or function is selected, the display 40 gives a choice of a menu of vehicles to select from or allows a selected amount or refrigerant to be keyed in by the operator. The amount is displayed as a preset figure which is representation of a typical vehicle air conditioner charge (e.g. 2.0 lb.) and can be increased or decreased by pressing or holding down a button. If the storage cylinder 20 does not have enough refrigerant for the charge, the operator is alerted by the display 40.

When the correct charge of refrigerant has been selected, pressure sensors PSA and PSC check the pressure in the system to be charged. If the pressure is above a predetermined value, such as 5 psig, the display 40 asks the operator if the apparatus should recover first. If the answer is no, then the apparatus will only allow vapor to be charged. The display 40 also will prompt the operator to start the engine of the vehicle and run the air conditioner. The apparatus (i.e. microprocessor) will then check sensor PSA for a drop in pressure to below, for example, 40 psig which would indicate that the air conditioner is running and functioning normally. Valves V7 and V2 then open and vapor flows through valves CV5 and CV8 to the low side of the external vehicle system. The cylinder load cell 22 monitors the amount of refrigerant added, and shuts off V2 and V7 when the pre-determined amount has been added.

If the pressure in the external system is less than, for example, 5 psig, and is not below a level of vacuum satisfactory for all moisture to have been vaporized (for example, below 27 in. Hg) then the display 40 will prompt the operator to evacuate the external system, and will not allow the external system to be charged. If the vacuum is below the preset requirement, then the display 40 will prompt the operator to add oil to the external system. This is done by opening valve 122 (HV12). The oil flows via B22 to the oil reservoir 124 and any excess oil will flow through valve CV6 and CV10 and into the external system. The amount of oil added can be viewed by the operator and a graduation scale provided to determine the correct amount of oil. The apparatus 10 then opens valve V8 to allow liquid refrigerant to flow through the oil reservoir 124 washing the oil with it as it enters the external system. After 10% of the charge has been added, valve V8 closes and the display 40 prompts the operator to test the system for leaks. After a preset time delay, the operator can proceed or terminate the procedure. If he proceeds, then the apparatus 10 will shut off when a preset amount of refrigerant has been added to the external system. The display 40 will advise that the charge is complete. If during charging the pressure in the external system rises to a point where it equals that of the storage cylinder 20, the refrigerant will no longer flow. The microprocessor monitors the reading of load cell 22. If it is not falling, and yet a predetermined amount of refrigerant has not been added to the external system, the operator is alerted that vapor must be added which is then performed as above described.

A liquid pump may be installed in the liquid supply line to assist in charging of liquid. This will reduce the chance of an incomplete charge occurring and the need to resort to a vapor charge as described. This will reduce labor input also. Alternatively, positive flow of liquid can be assuredly increasing the pressure in the cylinder 20. This can be done by heating the cylinder with an electrical heating element.

While the illustrated embodiment employs a single storage cylinder 20, it is contemplated that two storage cylinders could be employed, one holding recovered refrigerant and the other holding a supply of clean refrigerant should the primary recovery cylinder run out at any time. A trip mechanism would be provided to allow the second or spare cylinder to transfer its weight to the load cell 22.

Flush Cycle

The flush cycle allows the operator to charge liquid refrigerant into the high pressure side of the external system being serviced, and at the same time recover from the low pressure side. The same parameters apply as for recovery, evacuate and charge. The flush cycle or mode starts with valve V8 allowing liquid refrigerant into the high pressure side, provided that the external system has been evacuated. If not, then the apparatus 10 will recover and evacuate as necessary before flushing begins. Flushing continues for a preset time limit or until a predetermined amount of refrigerant has been removed from the storage cylinder 20. An alternative procedure is to delay start of the recover part of the procedure until a certain amount of refrigerant has left the cylinder 20, then close valve V8 and recover, etc., as described. Flushing is ended by the closing valve V8 after which the normal recovery cycle or function occurs, including bleeding non-compressible gas. The purpose of flushing is to remove any dirty oil and other contaminants from the system, often needed after a compressor failure. Refrigerant is a very effective solvent.

Service Cycle

The service cycle allows an operator to remove any refrigerant from the filters and the compressor sump to allow changing of the oil and filters in the apparatus 10. This is achieved by recovering the high pressure side. At the same time, the low pressure side filter 72 and compressor sump are also recovered automatically. Valves V7 and V9 are closed and valve V3 opened to allow refrigerant to bypass the high side filter (and storage if fitted). Refrigerant flows through valves V2, CV5, V6, and into the low side of accumulator chamber 94, then out via valves CV3 and V3 to the storage cylinder 20. The normal recovery procedure applies except that there is no non-compressible gas check.

At completion of the service cycle, the operator is informed by the display 40 that he may now service the apparatus 10. A flag is tripped in the memory so that even if the apparatus 10 is disconnected from power, it cannot be used until the recommission function has been activated.

Recommission Cycle

During the commission cycle the high pressure side filter chamber 64b is evacuated (which automatically includes the low filter chamber 66b and compressor). Valves V2, V6, and V4 are opened and air is pumped to atmosphere as in a normal evacuation. At the end of a predetermined time limit these valves are all closed and the compressor stopped. V3, V2, V6, V11, V9 and V7 are opened for a preset time and refrigerant vapor pressurizes the whole housing assembly 32 and associated compressor, etc. As in a normal evacuation cycle all time delays are included and any vacuum leaks cause the apparatus to stop and alert the operator.

Processor Control

The control system for the refrigerant servicing apparatus 10 includes a dedicated microprocessor system which is programmed to control the various control valves and the procedural logic associated with the various functions of the apparatus. Sensors are provided for pressure, temperature, weight, and refrigerant level. These sensors are interfaced directly to the microprocessor based control system. Operator communications are provided through the LCD display 40 and the push button keypad 42. Outputs from the apparatus control all the solenoid valves which determine the various functions of the apparatus. Other outputs are used to control heating of the refrigerant, and provide an audible alarm. The system software causes both "housekeeping tasks" and main procedure cycles or tasks to be performed with minimum operator input and control. The various aforedescribed operating cycles are initiated by the front panel keypress or push buttons 42.

These housekeeping tasks run continuously and perform a supporting role to the main operating cycles or functions which are only run "one at a time". FIG. 10 shows in flow diagram format the processor methodology for the various housekeeping tasks. One such task is heater control. When the motor 118 is running and valve V4 is closed, the compressor/pump 116 acts as a compressor. The refrigerant heater 102 is used to control the accumulator chamber fluid temperature at 90 degrees C. If valve V4 is open, the pump acts as a vacuum pump and the heater is forced off. A software based clock is used to control all system timing functions, and also maintains the filter timer. The cpu activity is continuously monitored using a separate watchdog circuit; if the cpu behaves abnormally, the watchdog takes over and resets the system.

All analog inputs are continuously monitored to maintain the front panel LCD display of various pressures, temperatures and cylinder weight. Periodically the system performs an automatic calibration of the analog interface circuitry to compensate for drift. The keypad 42 is continuously monitored to determine which function the operator wishes to perform, or in some cases, to determine if the operator wishes to abort a particular procedure. The operator display 40 is continuously updated to show relevant system variables, and indicate the progress of the current procedure.

FIG. 11 illustrates in flow diagram format the processing methodology of the recovery procedure or cycle. Its operation is as follows:

1. Check if commissioned, if not, go to commissioning procedure.
2. Check cylinder weight, if greater than 70% full, ask operator if this is sufficient space for a recovery, otherwise go ahead with recovery. If space is insufficient, prompt operator for a new cylinder to be fitted.
3. Determine if there is any refrigerant to recover. Open V10 for 1 second, to equalize suction side and discharge side, if the pressure measured at PSA is less than 35 KPA, there is no refrigerant to recover, so return to main menu.
4. Open V10, V7, V6, V9 and start motor, this starts the recovery.
   Wait for pressure at PSA to drop below −50 KPA.
   Stop motor and close V10, V7, V6, V9.
   Wait for 20 seconds, and re-check PSA is less than −20 KPA, if not repeat step 4 until the vacuum holds.
   Check cylinder capacity during the recovery procedure.
5. Go to refrigerant non-compressible gas procedure.
6. Return to main menu.

Figure 12A:
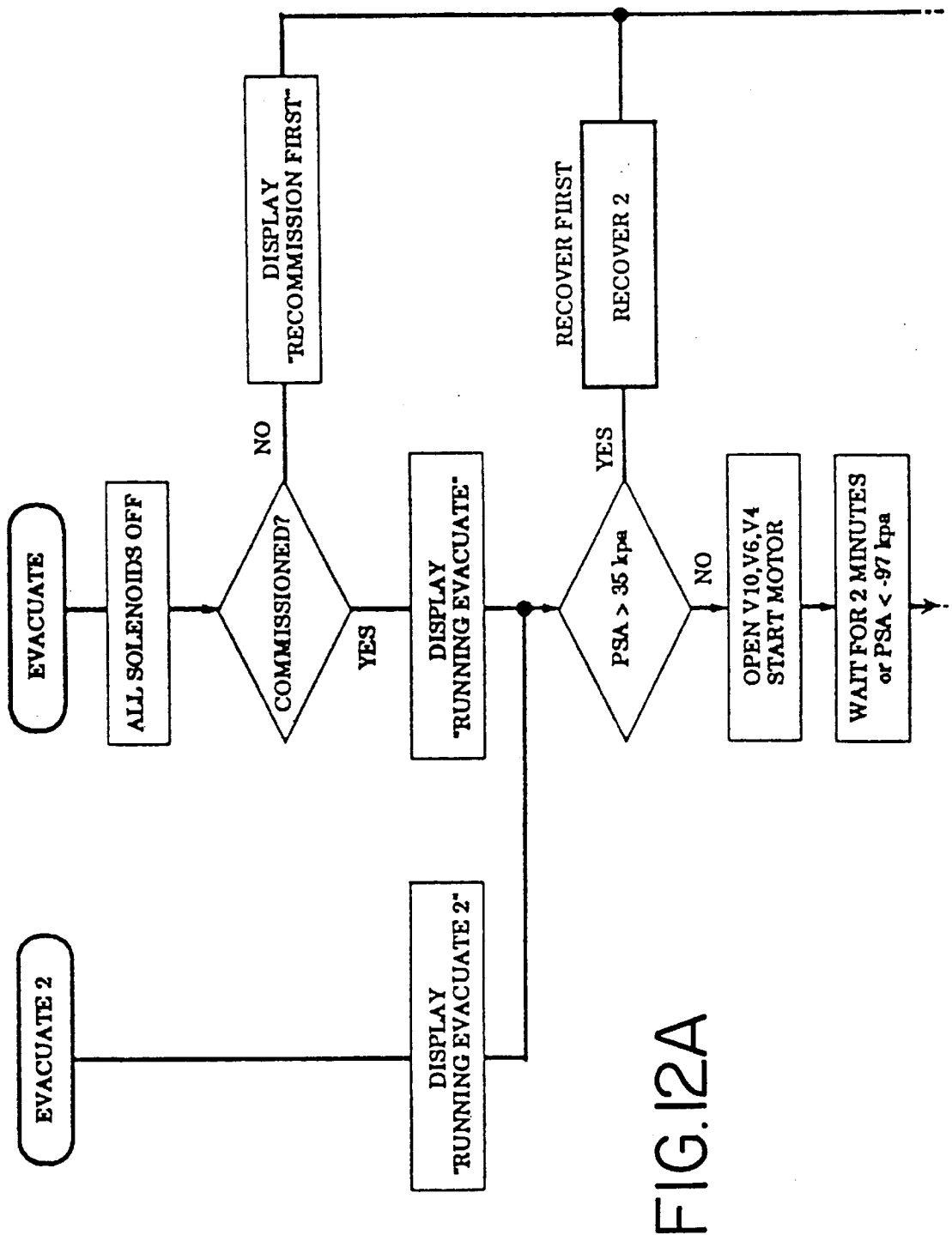
FIGS. 12A and 12B are a flow diagram for the processing mythology for carrying out an evacuate cycle under the menu selection alternatives presented in FIG. 10.
Figure 12B:
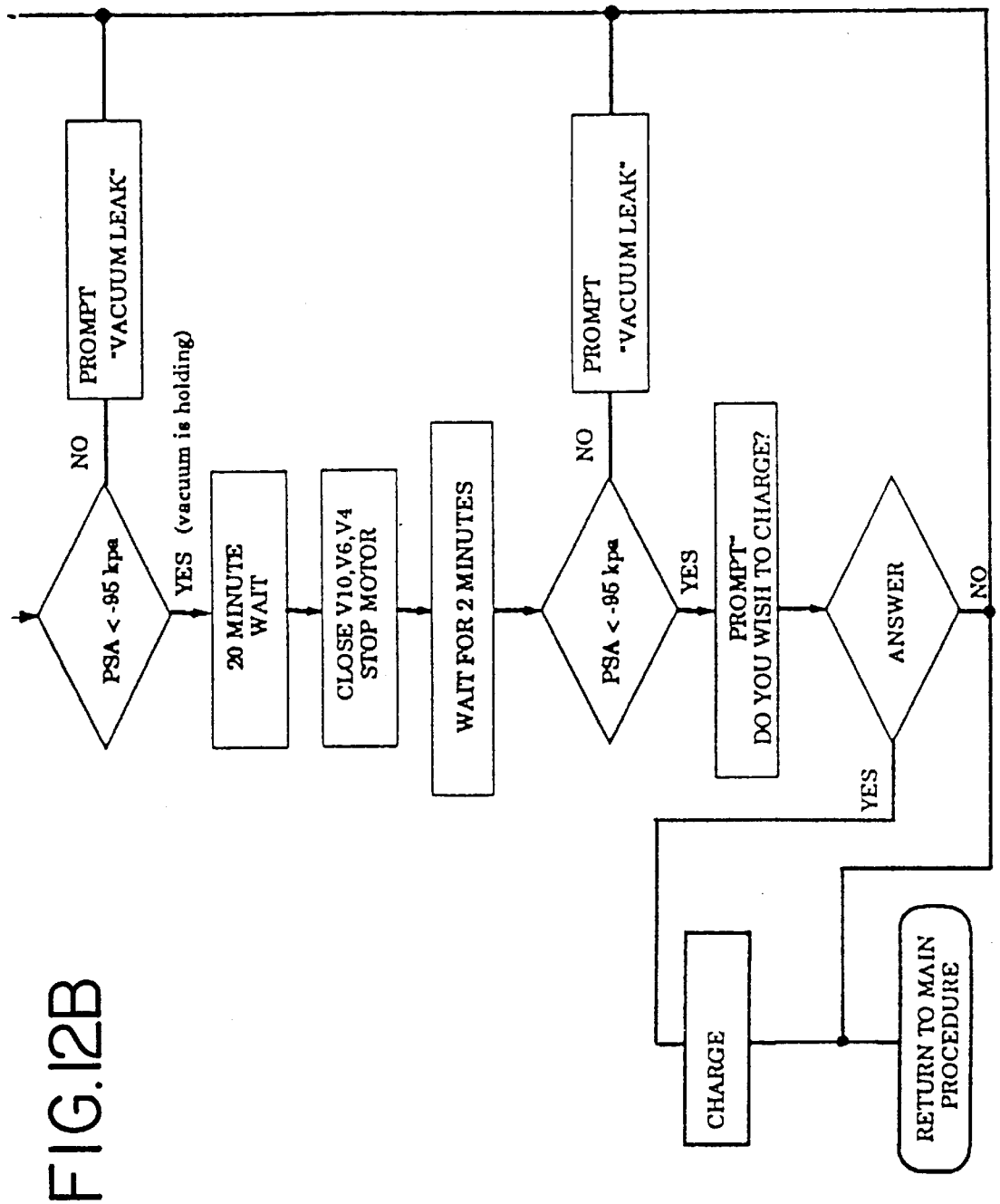

FIG. 12 is a flow diagram of the processing methodology for the evacuate procedure which is carried out as follows:

1. Check if commissioned. If not, got to commissioning procedure.
2. Check if there is some refrigerant in the system. If there is, go to recovery procedure.
3. Open V10, V6, V4, and start motor. Evacuate until PSA reads less than −97 KPA. (If fitted, V12 opens when PSA drops below −90 KPA).
4. Close V10, V6, V4, and stop motor. (V12 off). Wait for 2 minutes while checking PSA, for any rise in pressure that would indicate a vacuum leak. If vacuum holds at −95 KPA or better, then continue evacuating for 20 minutes.
5. Ask operator if he wishes to go to charge procedure. If he doesn't then return to main menu.
6. If vacuum failed during step 4, warn the operator that there is a vacuum leak in the system before returning to the main menu.

Figure 13A:
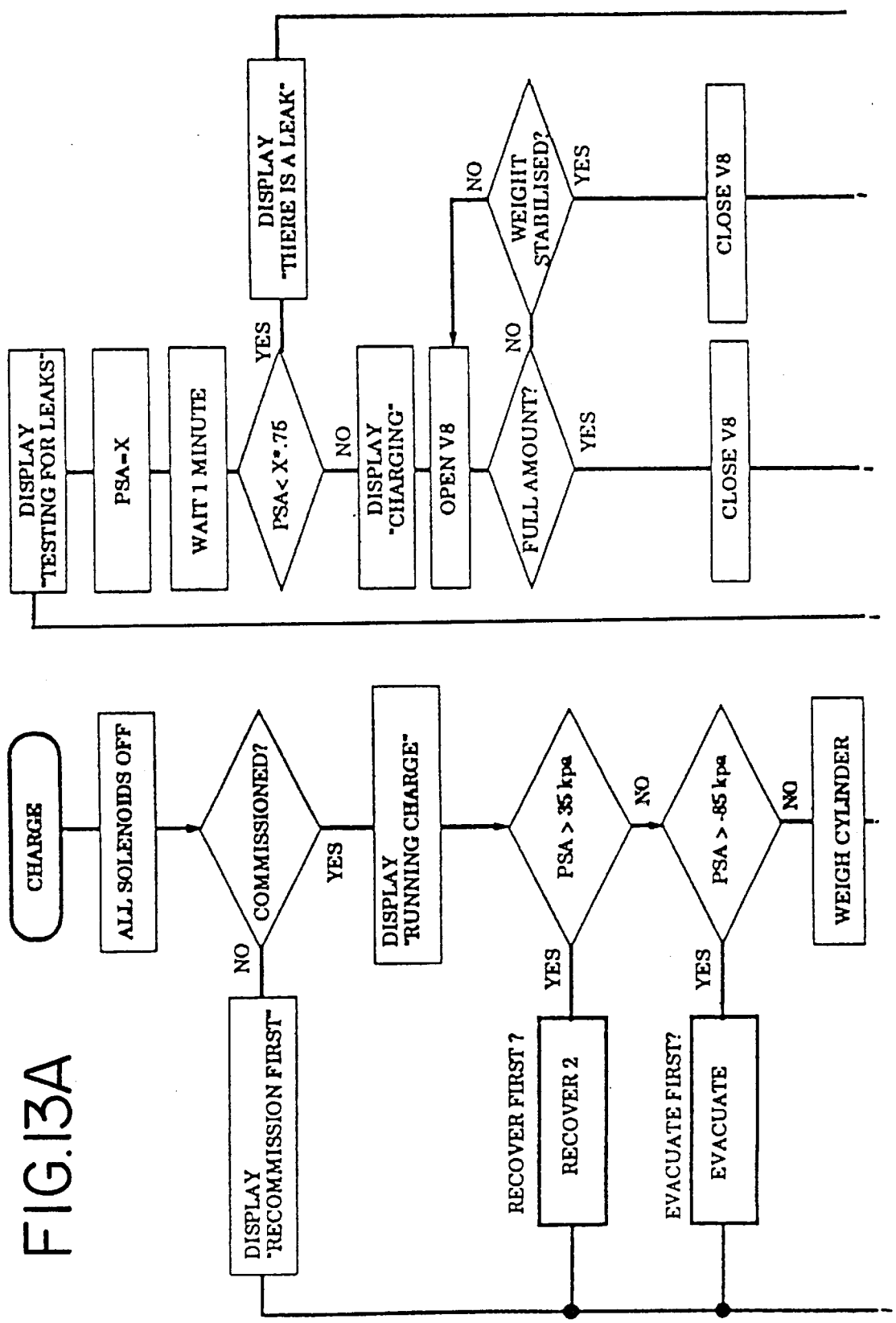

FIG. 13 illustrates in flow diagram format the processing methodology for the charge cycle or procedure, and operates in the following steps:

1. Check if commissioned. If not, go to commissioning procedure.
2. Measure amount of refrigerant in the cylinder, and display amount.
3. Ask operator to enter charge, either using system data on car models or by entering actual amount of charge required.
4. Ask operator to stop car engine.
5. Ask operator to check oil and add if required.
6. Add first 10% (liquid), by opening V8 and waiting until cylinder weight has decreased by 10% of the total charge amount.
7. Test for refrigerant leaks, before proceeding to add any more refrigerant. If leakage is detected, warn operator, and return to main menu.
8. If no leakage was detected, proceed to add remainder of refrigerant. If weight stabilizes before the full amount has been added, it may be already full. (This is checked again in step 11.)

9. Ask operator to turn compressor by hand.
10. Ask operator to start engine and run air conditioner unit.
11. Check again if full charge was added in step 8. If not, then ask operator if he wishes to try adding refrigerant to the low pressure side (vapor only). If he chooses to do so, confirm that air conditioner unit is running. Check PSA. If greater than 35, then warn operator that pressure is too high. Ask if he wishes to proceed anyway. If he does, then open V7 and V2 and wait until full amount has been added. If operator chooses, abort to main menu.

Figure 14:
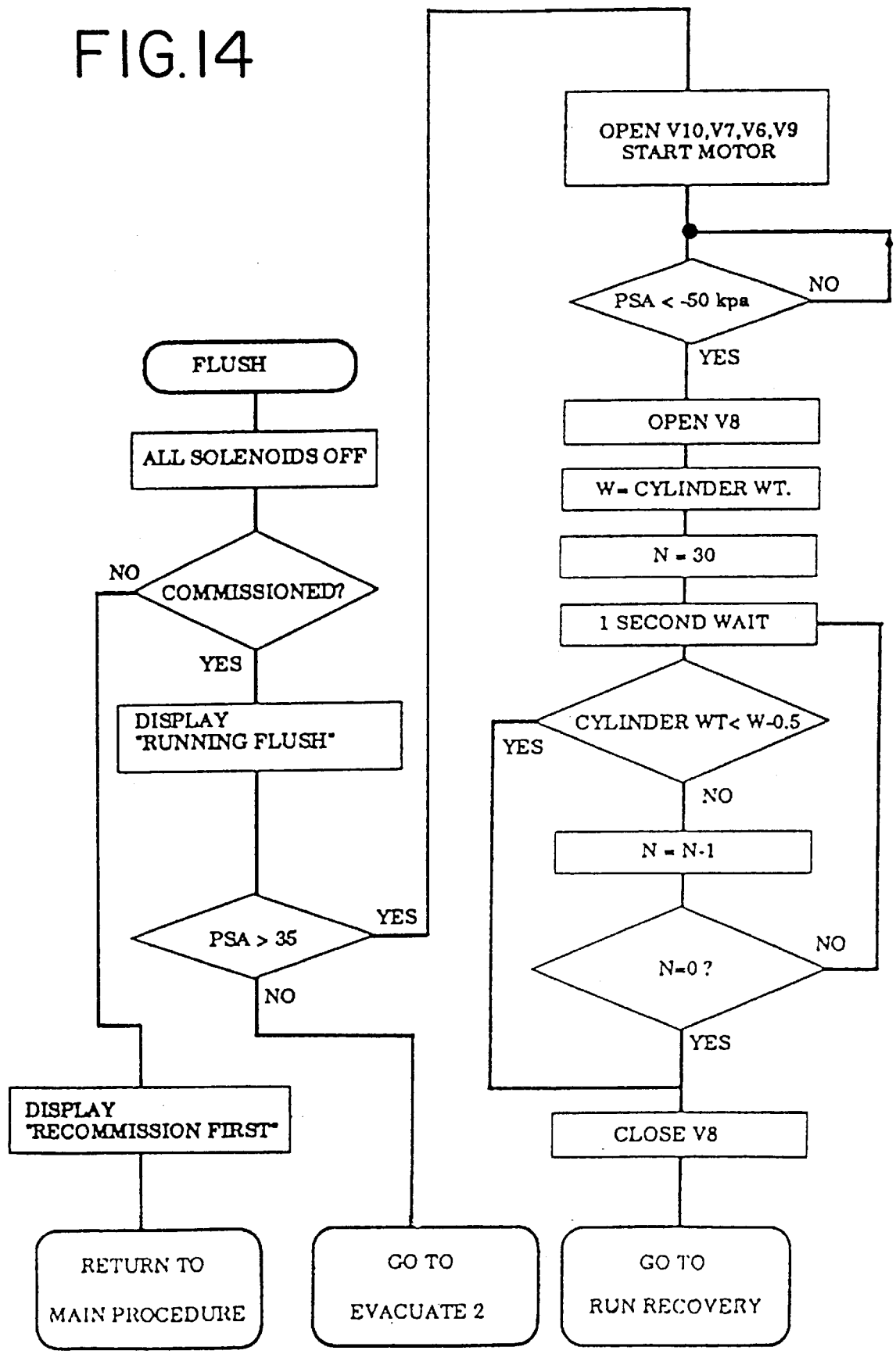
FIG. 14 is a flow diagram illustrating the processing mythology for carrying out a flush procedure with the refrigerant servicing apparatus.

FIG. 14 illustrates in flow diagram format the processing methodology for the flush cycle procedure, and includes the following steps:

1. Check if commissioned. If not, go to commissioning procedure.
2. Check that PSA is greater than 35, if not, got to evacuate procedure.
3. Open V10, V7, V6, V9, and start motor.
4. Wait until PSA drops to less than −50 KPA.
5. Check cylinder weight, then open V8 to ad refrigerant.
6. Wait until 0.5 Kg of refrigerant has been added to the system.
7. Close V8.
8. Go to recovery procedure.
9. Re-check refrigerant for contamination.

Figure 15:
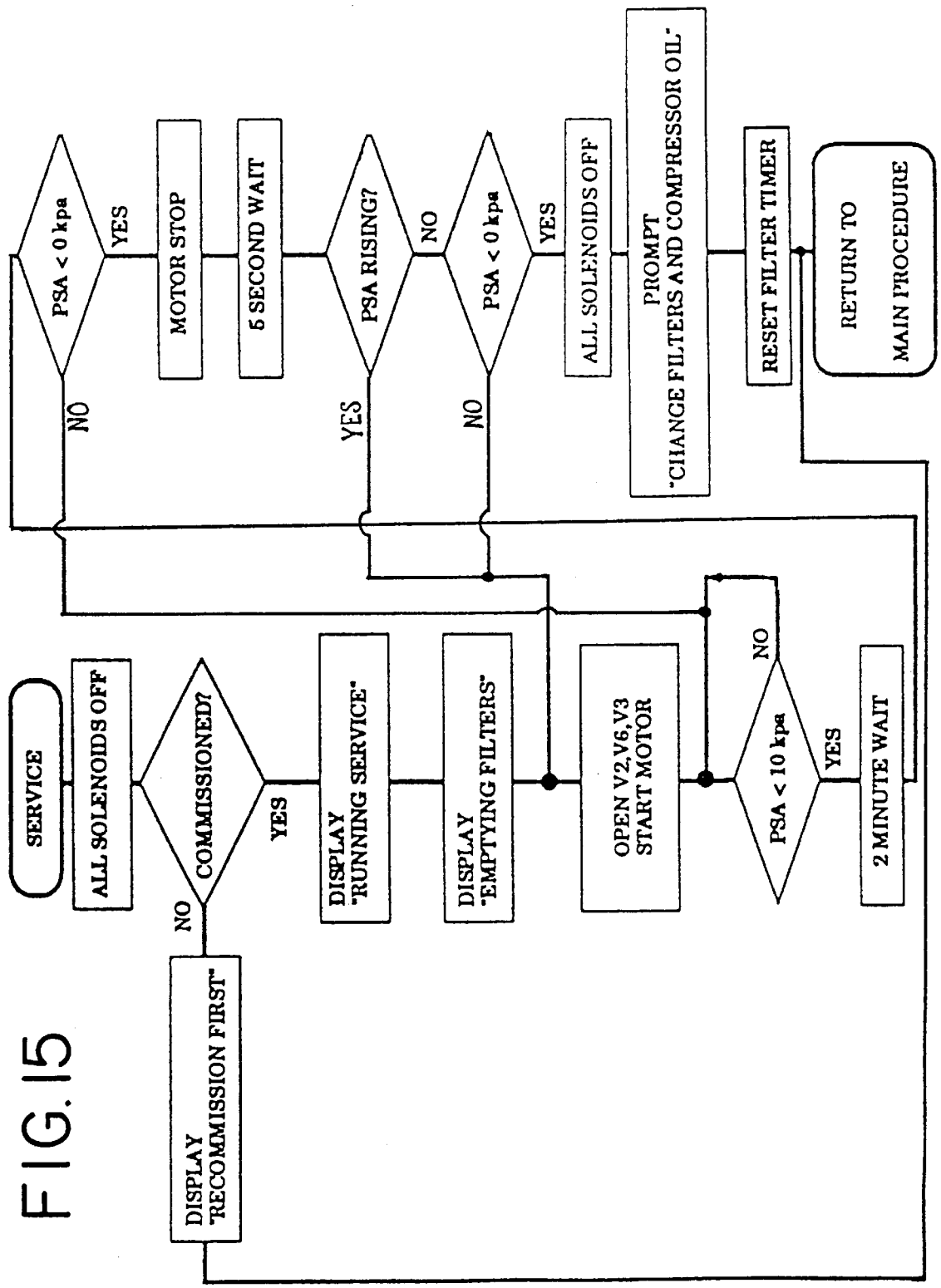
FIG. 15 illustrates in flow diagram format the processing mythology for carrying out a servicing procedure in accordance with the refrigerant servicing apparatus of FIGS. 1 and 2.

FIG. 15 is a flow diagram of the processing methodology for the service cycle or procedure, and includes the following steps:

1. Open V2, V6, V3 and start motor.
2. Wait until PSA is less than 10 KPA.
3. Wait a further 2 minutes.
4. Stop motor and wait 5 seconds.
5. Repeat steps 1 through 4 until PSA is still under vacuum and not rising.
6. Ask operator to change filters and compressor oil.
7. Return to main menu.

Figure 16:
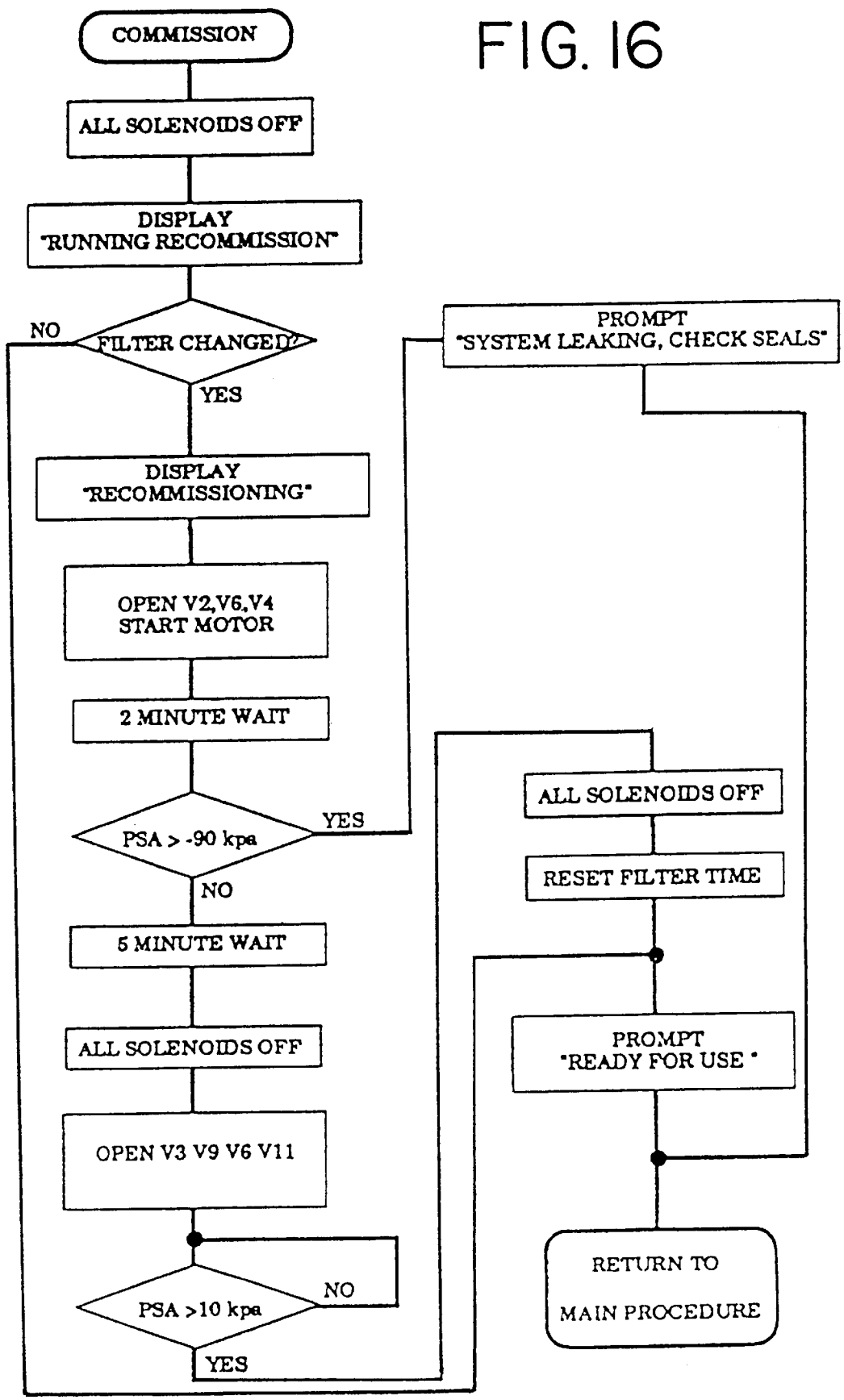
FIG. 16 illustrates in flow diagram format the processing mythology for carrying out a commission procedure with the refrigerant servicing apparatus of FIGS. 1 and 2.

FIG. 16 is a flow diagram of the processing methodology for the commissioning cycle or procedure, and includes the following steps:

1. Check if filter has been changed. If not, return to main menu.
2. Open V2, V6, V4, and start motor.
3. If PSA fails to reach −90 KPA within 2 minutes, warn operator of vacuum leak and return to main menu.
4. Wait 15 minutes. Motor off, close V4.
5. Open V3, V9, V11, V7, V2 and V6.
6. Wait until PSA rises to greater than 10 KPA, then close all valves.
7. Clear filter timer and remember filter change.
8. Display ready for use message.
9. Return to main menu.

Figure 17A:
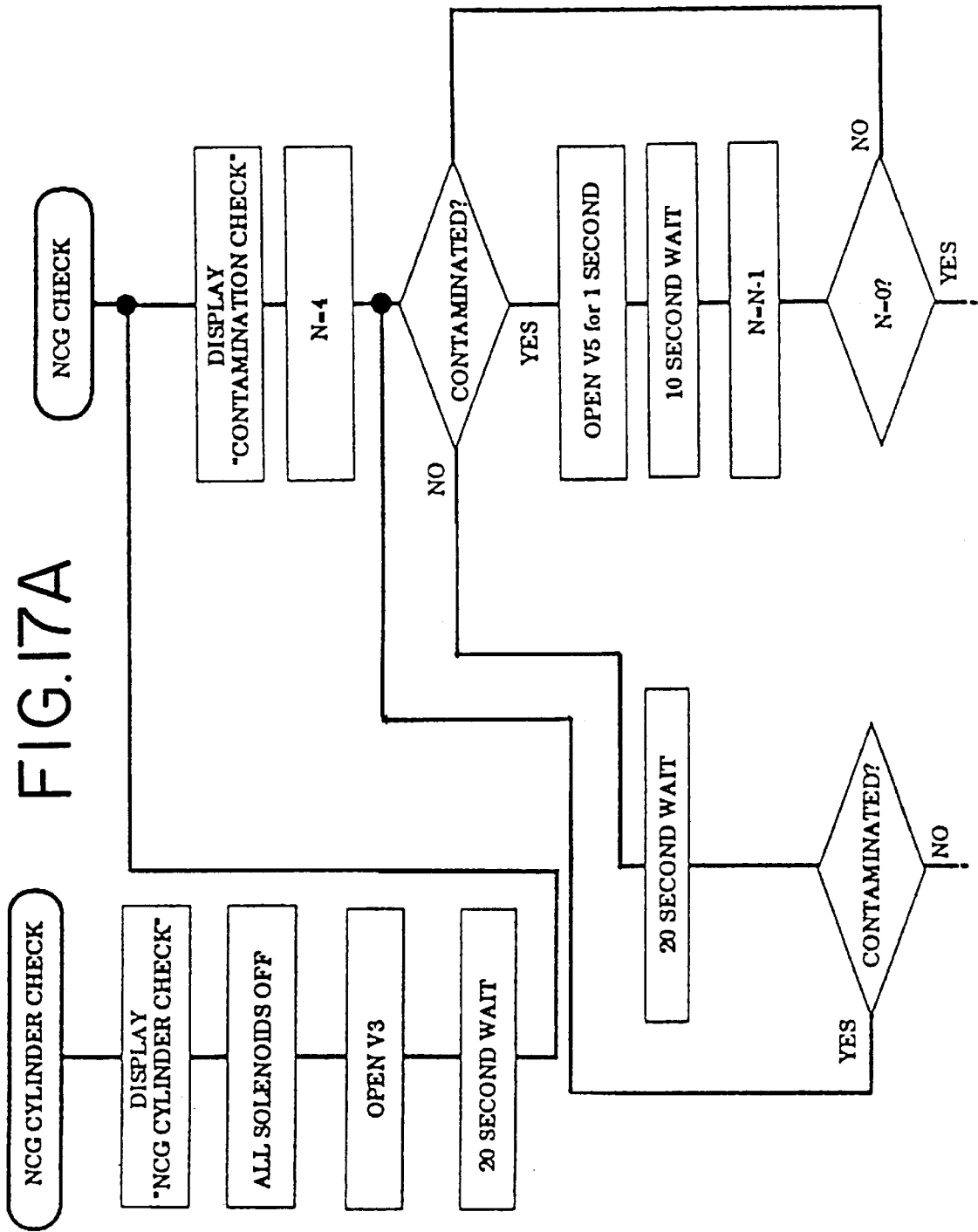
FIGS. 17A and 17B illustrate in flow diagram format the processing mythology for carrying out a checking procedure for non-compressible gas with the refrigerant servicing apparatus.
Figure 17B:
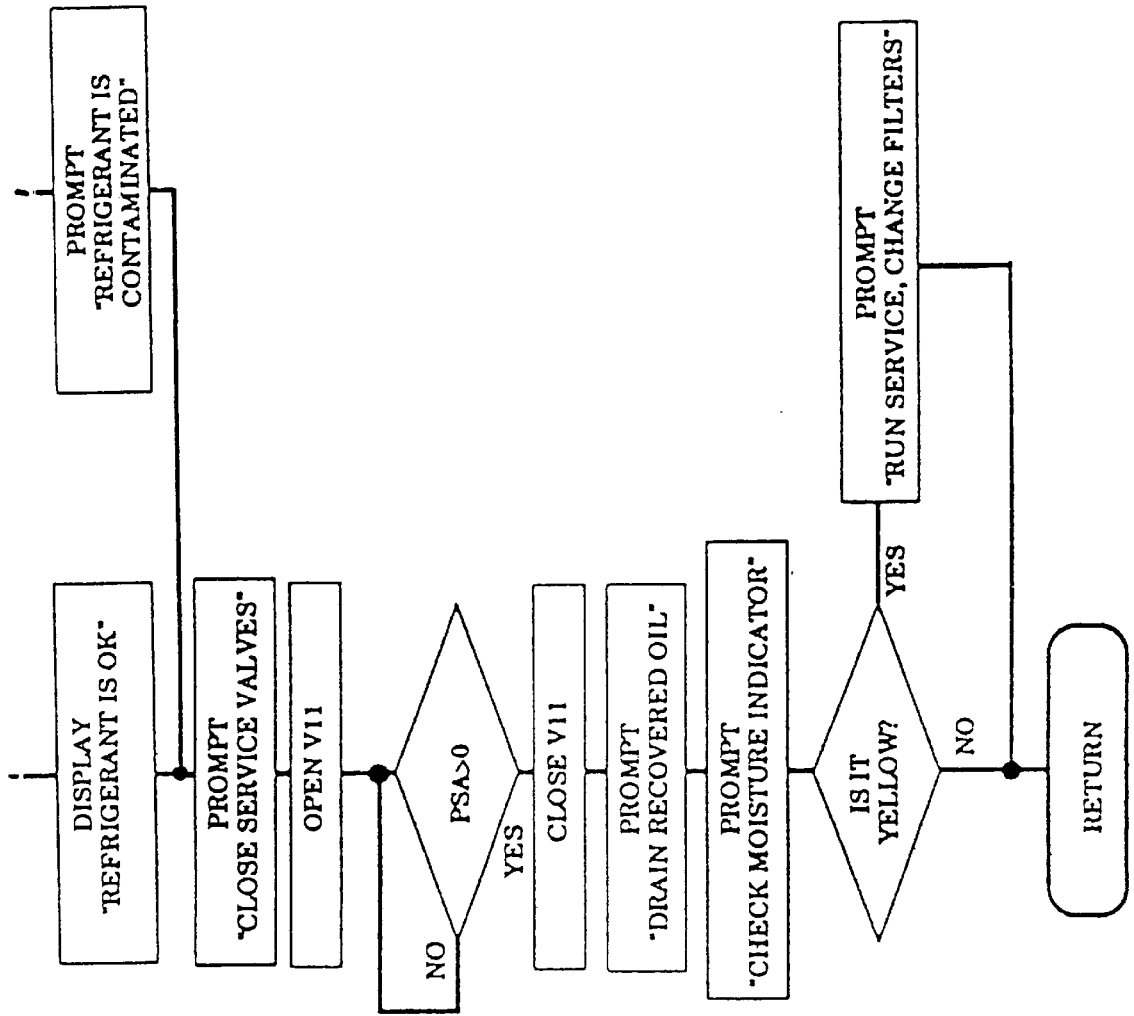

FIG. 17 is a flow diagram of the processing methodology for the refrigerant non-compressible gas check procedure, and includes the following steps:

1. Read PSB and temperature sensor 2.
2. Check the refrigerant data tables in memory, for the maximum pressure allowed at the measured temperature. If pressure is greater than allowed for the refrigerant in use, exhaust a small amount by opening V5 for 1 second.
3. Repeat steps 1 and 2 a number of times. If contamination is diminishing, keep cycling. Otherwise exit, warning operator that refrigerant is contaminated. When operator acknowledges, return to the main menu. If refrigerant is ok, proceed.
4. Ask operator to close service valves.
5. Open V11 and wait until PSA is above 0 KPA, then close V11.
6. Ask operator to drain recovered oil.
7. Ask operator to check moisture indicator.
8. Ask operator if indicator is yellow.
9. If indicator is yellow, then ask operator to run service procedure and change filters.
10. Return.

Each time the machine is operated after it has been idle for a considerable period (e.g. overnight) and the temperatures has stabilized, non-compressible gas venting takes place. To check the cylinder for non-compressible gas check.

1. Open V3 and perform steps 1, 2 and 3 above in order to vent any non-compressible gas which may be in the top of the storage cylinder 20.

Figure 18A:
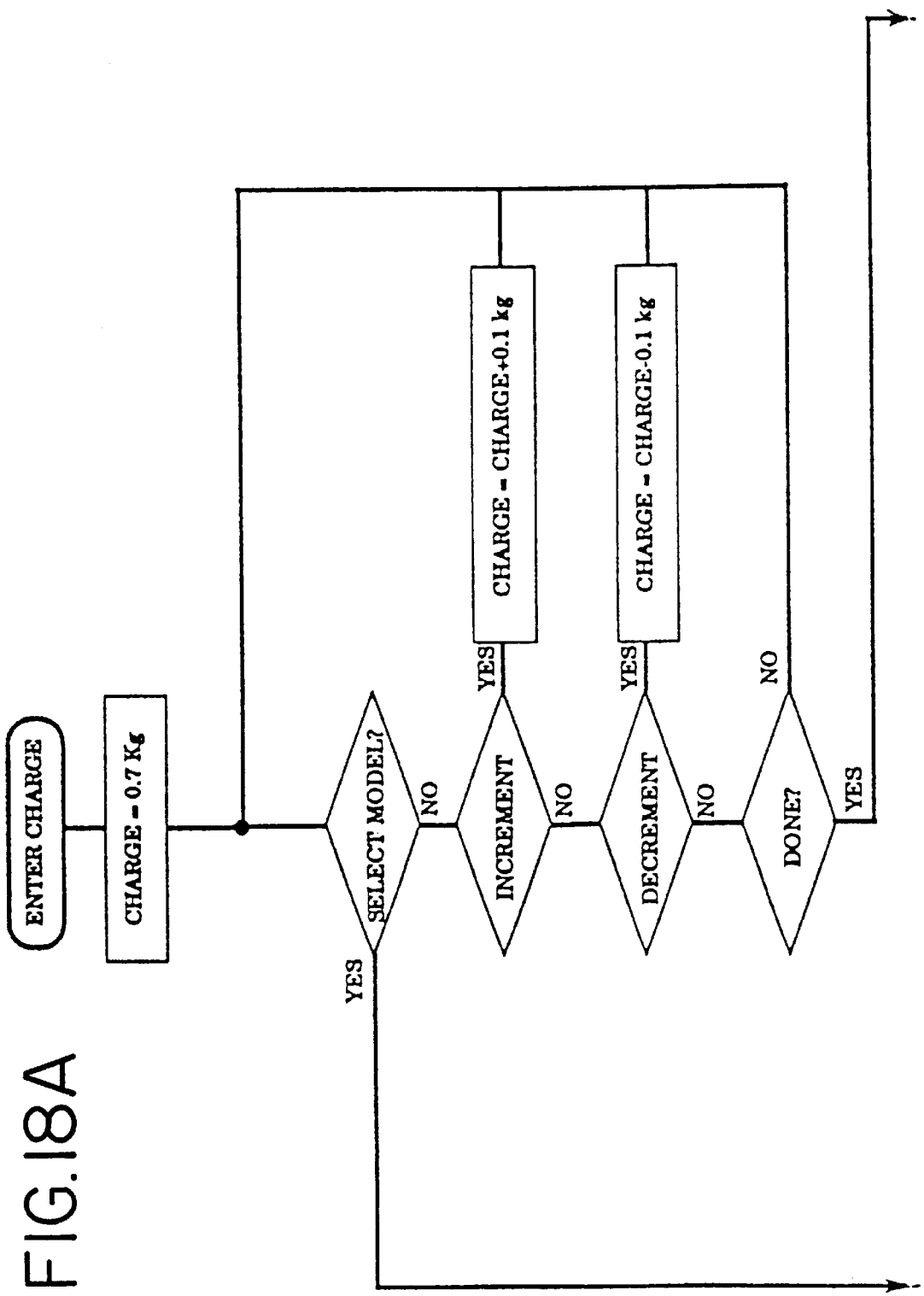
FIGS. 18A and 18B illustrate in flow diagram format the processing mythology for entering a charge into a refrigeration system in accordance with the refrigerant servicing apparatus of FIGS. 1 and 2.
Figure 18B:
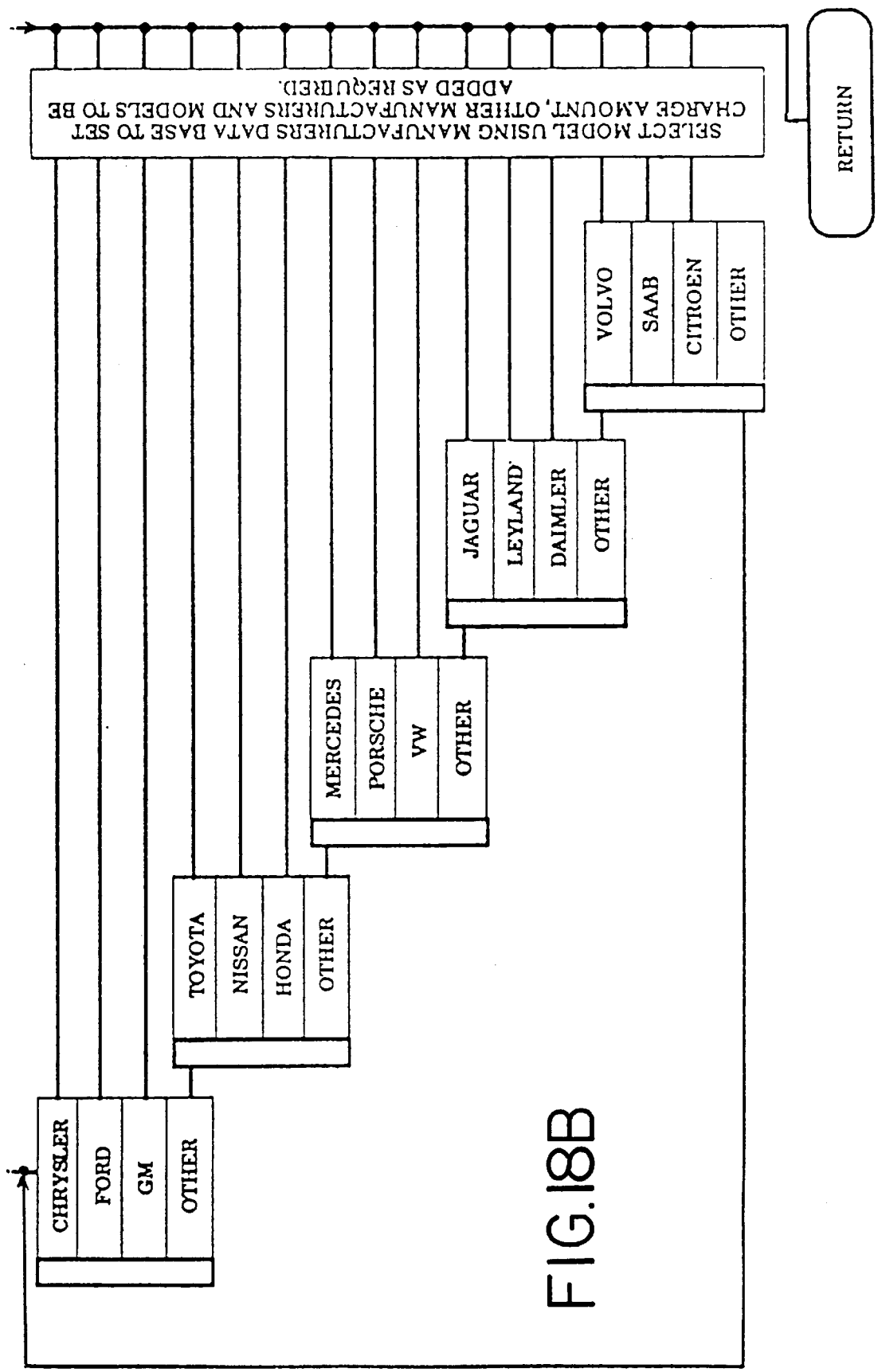

FIG. 18 is a flow diagram illustrating the processing methodology for entering a selected refrigerant charge into a vehicle air conditioner system, wherein the processor memory has a menu for selecting a charge corresponding to the particular make of automobile being serviced. In the illustrated embodiment, the four pushkeys 42 enable the operator to select one of four menu choices presented on the display 40 at a given time.

FIG. 19 illustrates in flow diagram format the processing methodology for adding refrigerant to the low pressure side of the control circuit within the housing assembly 32 as illustrated schematically in FIG. 8.

While a preferred embodiment of the present invention has been illustrated and described, it will be understood to those skilled in the art the changes and modifications may be made therein without departing from the invention in its broader aspects.

Various features of the invention are defined in the following claims.

What is claimed is:

1. A system for servicing a refrigeration apparatus comprising, in combination; a portable housing defining an accumulator chamber, a condenser chamber, high and low pressure filter chambers, and a fluid storage chamber, flow control means operatively associated with said housing for enabling selective flow communication between said chambers, flow conduit connecting said housing in flow communication with the refrigeration apparatus to be serviced to facilitate removal and return of refrigerant from and to the refrigeration apparatus, a refrigerant storage vessel releasably connected to said housing for receiving refrigerant from said housing after removal from the refrigeration apparatus being serviced, and at least one control valve coupled between said storage vessel and said housing for selectively preventing flow of refrigerant to said storage vessel and causing the refrigerant to flow into said fluid storage chamber in said housing.

2. A system as defined in claim 1 including a compressor connected to said housing through said flow control means so as to receive refrigerant from a low pressure side of the refrigeration apparatus being serviced and pressurize said refrigerant, said flow control means enabling pressurized refrigerant from the compressor to bypass the high pressure filter chamber and pass to said storage vessel so as to isolate said high pressure filter chamber to enable servicing thereof.

3. The system as defined in claim 1 wherein said at least one control valve enables said storage vessel to be disconnected from said housing while enabling continued recovery of refrigerant from the refrigeration apparatus being serviced.

4. The system as defined in claim 1 wherein said housing is supported on a support frame adapted to support said storage vessel and having wheels enabling movement thereof.

5. A system as defined in claim 1 wherein said housing comprises a module housing defining said chambers internally therein.

6. A system as defined in claim 5 wherein said housing has external cooling fins and/or internal heat transfer fins exposed within selected ones of said chambers.

7. Apparatus for servicing a refrigeration system having a high pressure connection and a low pressure connection and utilizing a refrigerant containing an oil lubricant, said apparatus comprising, in combination: a housing defining an accumulator chamber, an oil separator chamber, and high and low pressure filter chambers; a compressor having a sump; a control plate operatively associated with said housing and said compressor and defining a plurality of flow passages enabling selective flow communication between said chambers and compressor; at least one flow conduct for connecting said control plate in flow communication with the refrigeration system being serviced to facilitate passage of refrigerant from the refrigeration system to the low pressure filter chamber, said low pressure filter chamber being connected to said compressor to enable flow of refrigerant to a low pressure side of the compressor; said oil separator chamber being connected to a high pressure side of said compressor to receive pressurized refrigerant from the compressor, said oil separator chamber being connected to the sump of the compressor through a valve control enabling return of oil from the oil separator chamber to said sump; and at least one flow passage between said sump and said accumulator chamber to enable passage of oil from said sump to said accumulator chamber when said oil separator chamber is under pressure and said valve control is opened; and a drain for draining recovered oil from said accumulator chamber.

* * * * *